(12) United States Patent
Luo et al.

(10) Patent No.: US 12,170,958 B2
(45) Date of Patent: Dec. 17, 2024

(54) POWER-SAVING SIGNAL CONFIGURATION AND TRANSMISSION METHODS AND APPARATUSES

(71) Applicant: DATANG MOBILE COMMUNICATIONS EQUIPMENT CO., LTD., Beijing (CN)

(72) Inventors: Chen Luo, Beijing (CN); Jiaqing Wang, Beijing (CN); Meiying Yang, Beijing (CN); Zheng Zhao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 349 days.

(21) Appl. No.: 17/631,505

(22) PCT Filed: Jun. 2, 2020

(86) PCT No.: PCT/CN2020/094022
§ 371 (c)(1),
(2) Date: Jan. 31, 2022

(87) PCT Pub. No.: WO2021/017626
PCT Pub. Date: Feb. 4, 2021

(65) Prior Publication Data
US 2022/0279442 A1    Sep. 1, 2022

(30) Foreign Application Priority Data

Aug. 1, 2019 (CN) .......................... 201910709030.2
Sep. 18, 2019 (CN) .......................... 201910881885.3

(51) Int. Cl.
*H04W 52/02* (2009.01)
*H04W 76/28* (2018.01)

(52) U.S. Cl.
CPC ... *H04W 52/0216* (2013.01); *H04W 52/0235* (2013.01); *H04W 76/28* (2018.02)

(58) Field of Classification Search
CPC ......... H04W 52/0216; H04W 52/0235; H04W 76/28; H04W 48/16; H04W 52/0248;
(Continued)

(56) References Cited

U.S. PATENT DOCUMENTS

2019/0334687 A1* 10/2019 Su .......................... H04L 5/0053
2021/0076324 A1* 3/2021 Kaikkonen ....... H04W 52/0274

FOREIGN PATENT DOCUMENTS

CN    103889039 A    6/2014
CN    109496446 A    3/2019
(Continued)

OTHER PUBLICATIONS

3GPP TSG RAN WG1 Meeting #96bis, R1-19046535 (Year: 2019).*
(Continued)

*Primary Examiner* — Margaret G Mastrodonato
(74) *Attorney, Agent, or Firm* — Kilpatrick Townsend & Stockton LLP

(57) ABSTRACT

Disclosed in the present application are power-saving signal configuration and transmission methods and apparatuses. In the present application, a base station configures search space set configuration information of a power-saving signal, and sends same to a terminal. The power-saving signal search space set configuration information includes first configuration information and second configuration information; the first configuration information is search space set configuration information of a power-saving signal used when the terminal is in a short DRX cycle; and the second configuration information is search space set configuration information of a power-saving signal used when the terminal is in a long DRX cycle.

20 Claims, 3 Drawing Sheets

Configure, by a base station, search space set configuration information for a power-saving signal, wherein the search space set configuration information for the power-saving signal includes at least one of first configuration information or second configuration information, the first configuration information is search space set configuration information for the power-saving signal used when a terminal is in a short DRX cycle, and the second configuration information is search space set configuration information for the power-saving signal used when the terminal is in a long DRX cycle — S201

↓

Send, by the base station, the search space set configuration information for the power-saving signal to the terminal — S202

(58) Field of Classification Search
CPC ... H04W 52/0212; H04W 72/23; Y02D 30/70
USPC .................................................... 370/311
See application file for complete search history.

(56) References Cited

FOREIGN PATENT DOCUMENTS

| | | | | |
|---|---|---|---|---|
| CN | 109923904 A | 6/2019 | | |
| CN | 109952789 A | 6/2019 | | |
| CN | 112153724 A | 12/2020 | | |
| CN | 109952789 B | * | 1/2021 | ........ H04W 52/0216 |
| WO | 2019032009 A1 | 2/2019 | | |
| WO | 2020259254 A1 | 12/2020 | | |

OTHER PUBLICATIONS

Samsung, "PDCCH-based power saving signal/channel", 3GPP TSG RAN WG1 #97, Reno, USA, May 13-17, 2019, total 12 pages, R1-1906980.

CATT, "Power saving signal/channel design and performance", 3GPP TSG RAN WG1 Meeting #98, Prague, CZ, Aug. 26-30, 2019, total 19 pages, R1-1908605.

Ericsson, "RAN2 impact of WUS in connected mode", 3GPP TSG-RAN2 Meeting #106, Reno, USA, May 13-17, 2019, total 5 pages, R2-1906610 (Revision of R2-1904149).

Qualcomm Incorporated, "Introduction of Rel-15 eMTC enhancements (other than EDT)", 3GPP TSG-RAN2 Meeting #103, Gothenburg, Sweden, Aug. 20, 2018-Aug. 24, 2018, total 119 pages, RP-182081.

LG Electronics, "Discussion on PDCCH-based power saving signal/channel", 3GPP TSG RAN WG1 Meeting #96bis, Xi'an, China, Apr. 8-12, 2019, total 1 page, R1-1904635.

CATT, "Power saving signal/channel design and performance", 3GPP TSG RAN WG1 Meeting #98Bis, Chongqing, China, Oct. 14-20, 2019, total 18 pages, R1-1910353.

OPPO, "Impacts of PDCCH-based wake up signalling", 3GPP TSG-RAN WG2 Meeting #106, Reno, USA, May 13-May 17, 2019, total 1 page, R2-1905603.

* cited by examiner

POWER-SAVING SIGNAL CONFIGURATION AND TRANSMISSION METHODS AND APPARATUSES

CROSS-REFERENCE TO RELATED APPLICATIONS

The present disclosure is a National Stage of International Application No. PCT/CN2020/094022, filed on Jun. 2, 2020, which claims the priority of the Chinese patent application No. 201910709030.2 filed on Aug. 1, 2019, and the Chinese patent application No. 201910881885.3 filed on Sep. 18, 2019, both of which the entire contents are incorporated herein by reference.

FIELD

The present disclosure relates to the field of radio communication, in particular to power-saving signal configuration and transmission methods and an apparatus.

BACKGROUND

In a 5G NR system, a terminal needs to monitor a physical downlink control channel (PDCCH) at each PDCCH monitoring occasion, to determine whether user scheduling information is transmitted. One PDCCH monitoring occasion corresponds to a time length, for example, may be a time length of several symbols. A process for PDCCH monitoring at one PDCCH monitoring occasion is a PDCCH decoding process, and whether downlink control information (DCI) carrying the user scheduling information is transmitted on the PDCCH is determined according to a cyclic redundancy checking (CRC) result. If the user scheduling information is transmitted on the PDCCH, the terminal may obtain a CRC result with a positive value and may obtain the scheduling information carried in the DCI; otherwise, if the CRC result is a negative value, the terminal cannot obtain any information in the DCI.

When the terminal is configured with discontinuous reception (DRX), the terminal will discontinuously monitor the PDCCH. The terminal only monitors the PDCCH during DRX active period (DRX on-duration) or when an inactivity timer is not time out, to reduce power consumption of the terminal. The terminal may be configured with a long DRX cycle or a short DRX cycle, or be configured with the long DRX cycle and the short DRX cycle at the same time. The long DRX cycle may be an integral multiple of the short DRX cycle.

Before the active period (on-duration) of the DRX cycle, the base station may send the power-saving signal to the terminal for dynamically indicating the terminal whether to monitor the PDCCH during the active period of the next one or more DRX cycles. The power-saving signal is a PDCCH-based physical layer signal, and the process for monitoring the power-saving signal is consistent with a process for monitoring the PDCCH for user scheduling.

How to make the monitoring occasion for the power-saving signal be matched with the active period of the DRX under the condition that the terminal is configured with the long DRX cycle and the short DRX cycle at the same time is a problem needing to be solved at present.

SUMMARY

Embodiments of the present disclosure provide power-saving signal configuration and transmission methods and an apparatus.

A first aspect provides a power-saving signal configuration method, including: configuring, by a base station, a search space set configuration information for a power-saving signal, and sending the search space set configuration information for the power-saving signal to a terminal, and the search space set configuration information for the power-saving signal includes at least one of first configuration information or second configuration information, the first configuration information is search space set configuration information for the power-saving signal used when the terminal is in a short DRX cycle, and the second configuration information is search space set configuration information for the power-saving signal used when the terminal is in a long DRX cycle.

In one embodiment, the first configuration information includes a first monitoring periodicity, the first monitoring periodicity is N times of the short DRX cycle, and N is an integer greater than or equal to 0; and the second configuration information includes a second monitoring periodicity, the second monitoring periodicity is M times of the long DRX cycle, and M is an integer greater than or equal to 1.

In one embodiment, a first monitoring periodicity for the power-saving signal used when the terminal is in the short DRX cycle is associated with the short DRX cycle of the terminal, the first monitoring periodicity is N times of the short DRX cycle, and N is an integer greater than or equal to 0; and/or, a second monitoring periodicity for the power-saving signal used when the terminal is in the long DRX cycle is associated with the long DRX cycle for the terminal, the second monitoring periodicity is M times of the long DRX cycle, and M is an integer greater than or equal to 1.

In one embodiment, the first configuration information includes a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; and the second configuration information includes a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle.

In one embodiment, the method further includes: sending, by the base station, a high-level signaling to the terminal, and the high-level signaling is configured to notify at least one of a first time offset or a second time offset, the first time offset is a time offset from a monitoring occasion for the power-saving signal used when the terminal is in the short DRX cycle to the short DRX cycle, and the second time offset is a time offset from a monitoring occasion for the power-saving signal used when the terminal is in the long DRX cycle to the long DRX cycle.

In one embodiment, the first configuration information includes a first monitoring time window, and the first monitoring time window is a slot length for continuously monitoring the power-saving signal when the terminal is in the short DRX cycle; and the second configuration information includes a second monitoring time window, and the second monitoring time window is a slot length for continuously monitoring the power-saving signal when the terminal is in the long DRX cycle.

In one embodiment, the first configuration information includes a first control resource set associated with a search space set, and the first control resource set is configured to indicate a resource occupied by the power-saving signal during the short DRX cycle; and the second configuration information includes a second control resource set associated with the search space set, and the second control resource set is configured to indicate a resource occupied by the power-saving signal during the long DRX cycle.

In one embodiment, the first configuration information includes a first power-saving signal monitoring pattern, and the first power-saving signal monitoring pattern is a power-saving signal monitoring pattern used when the terminal is in the short DRX cycle; and the second configuration information includes a second power-saving signal monitoring pattern, and the second power-saving signal monitoring pattern is a power-saving signal monitoring pattern used when the terminal is in the long DRX cycle.

In one embodiment, the configuring, by the base station, the search space set configuration information for the power-saving signal, includes: configuring, by the base station, one search space set for the power-saving signal, and the search space set configuration information corresponding to one search space set includes at least one of the first configuration information or the second configuration information; or configuring, by the base station, a first search space set and a second search space set for the power-saving signal, and the search space set configuration information corresponding to the first search space set includes the first configuration information, and the search space set configuration information corresponding to the second search space set includes the second configuration information.

In one embodiment, under the condition of sending the power-saving signal by using beams, the configuring, by the base station, the search space set configuration information for the power-saving signal, includes: configuring, by the base station, one search space set for each beam in beams, and the search space set configuration information corresponding to each search space set includes at least one of the first configuration information or the second configuration information; or configuring, by the base station, a first search space set and a second search space set for each beam in beams, and the search space set configuration information corresponding to the first search space set includes the first configuration information, and the search space set configuration information corresponding to the second search space set includes the second configuration information.

In one embodiment, the method further includes: sending, by the base station, a high-level signaling to the terminal, and the high-level signaling is configured to notify the one or two time offsets associated with each of search space sets. If one search space set is associated with one time offset, the time offset is a time offset from the monitoring occasion for the power-saving signal shared when the terminal is in the short DRX cycles or the long DRX cycles to the short DRX cycle; if the one search space set is associated with the two time offsets, a first time offset in the two time offsets is the time offset from the monitoring occasion for the power-saving signal used when the terminal is in the short DRX cycle, and a second time offset in the two time offsets is a time offset from the monitoring occasion for the power-saving signal used when the terminal is in the long DRX cycle to the long DRX cycle.

In one embodiment, the method further includes: determining, by the base station, a DRX cycle where the terminal is located according to DRX configuration information and a data transmitting condition of the terminal, determining the monitoring occasion for the power-saving signal according to the DRX cycle where the terminal is located and the search space set configuration information for the power-saving signal, and sending the power-saving signal according to the monitoring occasion for the power-saving signal, and the DRX cycle where the terminal is located includes the short DRX cycle or the long DRX cycle.

A second aspect provides a power-saving signal transmission method, including: receiving, by a terminal, search space set configuration information for a power-saving signal sent by a base station, and monitoring the power-saving signal according to the search space set configuration information for the power-saving signal, and the search space set configuration information for the power-saving signal includes first configuration information and/or second configuration information, the first configuration information is search space set configuration information for the power-saving signal used when the terminal is in a short DRX cycle, and the second configuration information is search space set configuration information for the power-saving signal used when the terminal is in a long DRX cycle.

The monitoring, by the terminal, the power-saving signal according to the search space set configuration information for the power-saving signal, includes: monitoring the power-saving signal by using the first configuration information when the terminal is in the short DRX cycle, and not monitoring the power-saving signal when the terminal is in the long DRX cycle; or monitoring the power-saving signal by using the second configuration information when the terminal is in the long DRX cycle, and not monitoring the power-saving signal when the terminal is in the short DRX cycle; or monitoring the power-saving signal by using the first configuration information when the terminal is in the short DRX cycle, and monitoring the power-saving signal by using the second configuration information when the terminal is in the long DRX cycle.

In one embodiment, the first configuration information includes a first monitoring periodicity, the first monitoring periodicity is N times of the short DRX cycle, and N is an integer greater than or equal to 0; and the second configuration information includes a second monitoring periodicity, the second monitoring periodicity is M times of the long DRX cycle, and M is an integer greater than or equal to 1. The monitoring the power-saving signal by using the first configuration information when the terminal is in the short DRX cycle includes: monitoring the power-saving signal according to the first monitoring periodicity when the terminal is in the short DRX cycle; and the monitoring the power-saving signal by using the second configuration information when the terminal is in the long DRX cycle includes: monitoring the power-saving signal according to the second monitoring periodicity when the terminal is in the long DRX cycle.

In one embodiment, the first monitoring periodicity for the power-saving signal used when the terminal is in the short DRX cycle is associated with the short DRX cycle for the terminal, the first monitoring periodicity is N times of the short DRX cycle, and N is an integer greater than or equal to 0; and the second monitoring periodicity for the power-saving signal used when the terminal is in the long DRX cycle is associated with the long DRX cycle for the terminal, the second monitoring periodicity is M times of the long DRX cycle, and M is an integer greater than or equal to 1.

In one embodiment, the first configuration information includes a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; and the second configuration information includes a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle. The monitoring the power-saving signal by using the first configuration information when the terminal is in the short DRX cycle includes: monitoring the power-saving signal according to a position corresponding to the first monitoring occasion offset or the first time offset when the terminal is in the short DRX cycle; and the monitoring the power-saving signal by using the second configuration information when the terminal is in the long DRX cycle includes: monitoring the power-saving signal according to a position corresponding to the second monitoring occasion offset or the second time offset when the terminal is in the long DRX cycle.

In one embodiment, the monitoring the power-saving signal by using the first configuration information when the terminal is in the short DRX cycle includes: monitoring the power-saving signal according to a position corresponding to the first time offset when the terminal is in the short DRX cycle, and the first time offset is a time offset from a monitoring occasion for the power-saving signal used when the terminal is in the short DRX cycle to the short DRX cycle, and the first time offset is notified by the base station through a high-level signaling. The monitoring the power-saving signal by using the second configuration information when the terminal is in the long DRX cycle includes: monitoring the power-saving signal according to a position corresponding to the second time offset when the terminal is in the long DRX cycle, and the second time offset is a time offset from a monitoring occasion for the power-saving signal used when the terminal is in the long DRX cycle to the long DRX cycle, and the second time offset is notified by the base station through the high-level signaling.

In one embodiment, the first configuration information includes a first monitoring time window, and the first monitoring time window is a slot length for continuously monitoring the power-saving signal when the terminal is in the short DRX cycle; and the second configuration information includes a second monitoring time window, and the second monitoring time window is a slot length for continuously monitoring the power-saving signal when the terminal is in the long DRX cycle. The monitoring the power-saving signal by using the first configuration information when the terminal is in the short DRX cycle includes: monitoring the power-saving signal within a corresponding slot length according to the first monitoring time window when the terminal is in the short DRX cycle; and the monitoring the power-saving signal by using the second configuration information when the terminal is in the long DRX cycle includes: monitoring the power-saving signal within a corresponding slot length according to the second monitoring time window when the terminal is in the long DRX cycle.

In one embodiment, the first configuration information includes a first control resource set associated with a search space set, and the first control resource set is configured to indicate a resource occupied by the power-saving signal during the short DRX cycle; and the second configuration information includes a second control resource set associated with the search space set, and the second control resource set is configured to indicate a resource occupied by the power-saving signal during the long DRX cycle. The monitoring the power-saving signal by using the first configuration information when the terminal is in the short DRX cycle includes: monitoring the power-saving signal by using a corresponding resource according to the first control resource set when the terminal is in the short DRX cycle; and the monitoring the power-saving signal by using the second configuration information when the terminal is in the long DRX cycle includes: monitoring the power-saving signal by using a corresponding resource according to the second control resource set when the terminal is in the long DRX cycle.

In one embodiment, the first configuration information includes a first power-saving signal monitoring pattern, and the first power-saving signal monitoring pattern is a power-saving signal monitoring pattern used when the terminal is in the short DRX cycle; and the second configuration information includes a second power-saving signal monitoring pattern, and the second power-saving signal monitoring pattern is a power-saving signal monitoring pattern used when the terminal is in the long DRX cycle. The monitoring the power-saving signal by using the first configuration information when the terminal is in the short DRX cycle includes: monitoring the power-saving signal on a corresponding time domain resource according to the first power-saving signal monitoring pattern when the terminal is in the short DRX cycle; and the monitoring the power-saving signal by using the second configuration information when the terminal is in the long DRX cycle includes: monitoring the power-saving signal on a corresponding time domain resource according to the second power-saving signal monitoring pattern when the terminal is in the long DRX cycle.

A third aspect provides a base station, including: a processing device, configured to configure search space set configuration information for a power-saving signal, and the search space set configuration information for the power-saving signal includes at least one of first configuration information or second configuration information, the first configuration information is search space set configuration information for the power-saving signal used when a terminal is in a short DRX cycle, and the second configuration information is search space set configuration information for the power-saving signal used when the terminal is in a long DRX cycle; and a sending device, configured to send the search space set configuration information for the power-saving signal to the terminal.

A fourth aspect provides a terminal, including a receiving device, configured to receive search space set configuration information for a power-saving signal sent by a base station, and the search space set configuration information for the power-saving signal includes first configuration information and/or second configuration information, the first configuration information is search space set configuration information for the power-saving signal used when the terminal is in a short DRX cycle, and the second configuration information is search space set configuration information for the power-saving signal used when the terminal is in a long DRX cycle; and a processing device, configured to monitor the power-saving signal according to the search space set configuration information for the power-saving signal.

The processing device is specifically configured to: monitor the power-saving signal by using the first configuration information when the terminal is in the short DRX cycle, and not monitor the power-saving signal when the terminal is in the long DRX cycle; or monitor the power-saving signal by using the second configuration information when the terminal is in the long DRX cycle, and not monitor the power-saving signal when the terminal is in the short DRX cycle; or monitor the power-saving signal by using the first configuration information when the terminal is in the short DRX cycle, and monitor the power-saving signal by using the second configuration information when the terminal is in the long DRX cycle.

A fifth aspect provides a communication apparatus, including: a processor, a memory and a transceiver, and the processor is configured to read a computer instruction in the memory to execute: configuring, by a base station, search space set configuration information for a power-saving signal, and the search space set configuration information for the power-saving signal includes at least one of first configuration information or second configuration information, the first configuration information is search space set configuration information for the power-saving signal used when a terminal is in a short DRX cycle, and the second configuration information is search space set configuration information for the power-saving signal used when the terminal is in a long DRX cycle; and sending, by the base station, the search space set configuration information for the power-saving signal to the terminal.

In one embodiment, the first configuration information includes a first monitoring periodicity, the first monitoring periodicity is N times of the short DRX cycle, and N is an integer greater than or equal to 0; and the second configuration information includes a second monitoring periodicity, the second monitoring periodicity is M times of the long DRX cycle, and M is an integer greater than or equal to 1.

In one embodiment, a first monitoring periodicity for the power-saving signal used when the terminal is in the short DRX cycle is associated with the short DRX cycle for the terminal, the first monitoring periodicity is N times of the short DRX cycle, and N is an integer greater than or equal to 0; and/or a second monitoring periodicity for the power-saving signal used when the terminal is in the long DRX cycle is associated with the long DRX cycle for the terminal, the second monitoring periodicity is M times of the long DRX cycle, and M is an integer greater than or equal to 1.

In one embodiment, the first configuration information includes a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; and the second configuration information includes a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle.

In one embodiment, the transceiver is further configured to: send a high-level signaling to the terminal, and the high-level signaling is configured to notify at least one of a first time offset or a second time offset, the first time offset is a time offset from a monitoring occasion for the power-saving signal used when the terminal is in the short DRX cycle to the short DRX cycle, and the second time offset is a time offset from a monitoring occasion for the power-saving signal used when the terminal is in the long DRX cycle to the long DRX cycle.

In one embodiment, the first configuration information includes a first monitoring time window, and the first monitoring time window is a slot length for continuously monitoring the power-saving signal when the terminal is in the short DRX cycle; and the second configuration information includes a second monitoring time window, and the second monitoring time window is a slot length for continuously monitoring the power-saving signal when the terminal is in the long DRX cycle.

In one embodiment, the first configuration information includes a first control resource set associated with a search space set, and the first control resource set is configured to indicate a resource occupied by the power-saving signal during the short DRX cycle; and the second configuration information includes a second control resource set associated with the search space set, and the second control resource set is configured to indicate a resource occupied by the power-saving signal during the long DRX cycle.

In one embodiment, the first configuration information includes a first power-saving signal monitoring pattern, and the first power-saving signal monitoring pattern is a power-saving signal monitoring pattern used when the terminal is in the short DRX cycle; and the second configuration information includes a second power-saving signal monitoring pattern, and the second power-saving signal monitoring pattern is a power-saving signal monitoring pattern used when the terminal is in the long DRX cycle.

In one embodiment, the processor is specifically configured to: configure one search space set for the power-saving signal, and the search space set configuration information corresponding to one search space set includes at least one of the first configuration information or the second configuration information; or configure, by the base station, a first search space set and a second search space set for the power-saving signal, and the search space set configuration information corresponding to the first search space set includes the first configuration information, and the search space set configuration information corresponding to the second search space set includes the second configuration information.

In one embodiment, the processor is specifically configured to: under the condition of sending the power-saving signal by using beams: configure one search space set for each beam in beams, and the search space set configuration information corresponding to each search space set includes at least one of the first configuration information or the second configuration information; or configure a first search space set and a second search space set for each beam in beams, and the search space set configuration information corresponding to the first search space set includes the first configuration information, and the search space set configuration information corresponding to the second search space set includes the second configuration information.

In one embodiment, the transceiver is further configured to: send a high-level signaling to the terminal, and the high-level signaling is configured to notify the one or two time offsets associated with each of search space sets, and if one search space set is associated with one time offset, the time offset is a time offset from the monitoring occasion for the power-saving signal shared when the terminal is in the short DRX cycles or the long DRX cycles to the short DRX cycle; if the one search space set is associated with the two time offsets, a first time offset in the two time offsets is the time offset from the monitoring occasion for the power-saving signal used when the terminal is in the short DRX cycle, and a second time offset in the two time offsets is a time offset from the monitoring occasion for the power-saving signal used when the terminal is in the long DRX cycle to the long DRX cycle.

In one embodiment, the processor is further configured to: determine a DRX cycle where the terminal is located according to DRX configuration information and a data transmitting condition of the terminal, determine the monitoring occasion for the power-saving signal according to the DRX cycle where the terminal is located and the search space set configuration information for the power-saving signal, and send the power-saving signal according to the monitoring occasion for the power-saving signal, and the DRX cycle where the terminal is located includes the short DRX cycle or the long DRX cycle.

A sixth aspect provides a communication apparatus, including: a processor, a memory and a transceiver, and the processor is configured to read a computer instruction in the memory to execute: receiving search space set configuration information for a power-saving signal sent by a base station, and the search space set configuration information for the power-saving signal includes first configuration information and/or second configuration information, the first configuration information is search space set configuration information for the power-saving signal used when a terminal is in a short DRX cycle, and the second configuration information is search space set configuration information for the power-saving signal used when the terminal is in a long DRX cycle; and monitoring the power-saving signal according to the search space set configuration information for the power-saving signal, and the monitoring, by the terminal, the power-saving signal according to the search space set configuration information for the power-saving signal, includes: monitoring the power-saving signal by using the first configuration information when the terminal is in the short DRX cycle, and not monitoring the power-saving signal when the terminal is in the long DRX cycle; or monitoring the power-saving signal by using the second configuration information when the terminal is in the long DRX cycle, and not monitoring the power-saving signal when the terminal is in the short DRX cycle; or monitoring the power-saving signal by using the first configuration information when the terminal is in the short DRX cycle, and monitoring the power-saving signal by using the second configuration information when the terminal is in the long DRX cycle.

In one embodiment, the first configuration information includes a first monitoring periodicity, the first monitoring periodicity is N times of the short DRX cycle, and N is an integer greater than or equal to 0; and the second configuration information includes a second monitoring periodicity, the second monitoring periodicity is M times of the long DRX cycle, and M is an integer greater than or equal to 1.

The processor is specifically configured to: monitor the power-saving signal according to the first monitoring periodicity when being in the short DRX cycle; and monitor the power-saving signal according to the second monitoring periodicity when being in the long DRX cycle.

In one embodiment, a first monitoring periodicity for the power-saving signal used when the terminal is in the short DRX cycle is associated with the short DRX cycle of the terminal, the first monitoring periodicity is N times of the short DRX cycle, and N is an integer greater than or equal to 0; and a second monitoring periodicity for the power-saving signal used when the terminal is in the long DRX cycle is associated with the long DRX cycle for the terminal, the second monitoring periodicity is M times of the long DRX cycle, and M is an integer greater than or equal to 1.

In one embodiment, the first configuration information includes a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; and the second configuration information includes a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle.

The processor is specifically configured to: monitor the power-saving signal according to a position corresponding to the first monitoring occasion offset or the first time offset when being in the short DRX cycle; and monitor the power-saving signal according to a position corresponding to the second monitoring occasion offset or the second time offset when being in the long DRX cycle.

In one embodiment, the processor is specifically configured to: monitor the power-saving signal according to a position corresponding to the first time offset when being in the short DRX cycle, and the first time offset is a time offset from a monitoring occasion for the power-saving signal used when the terminal is in the short DRX cycle to the short DRX cycle, and the first time offset is notified by the base station through a high-level signaling; and/or monitor the power-saving signal according to a position corresponding to the second time offset when the terminal is in the long DRX cycle, and the second time offset is a time offset from a monitoring occasion for the power-saving signal used when the terminal is in the long DRX cycle to the long DRX cycle, and the second time offset is notified by the base station through the high-level signaling.

In one embodiment, the first configuration information includes a first monitoring time window, and the first monitoring time window is a slot length for continuously monitoring the power-saving signal when the terminal is in the short DRX cycle; and the second configuration information includes a second monitoring time window, and the second monitoring time window is a slot length for continuously monitoring the power-saving signal when the terminal is in the long DRX cycle.

The processor is specifically configured to: monitor the power-saving signal within a corresponding slot length according to the first monitoring time window when being in the short DRX cycle; and/or monitor the power-saving signal within a corresponding slot length according to the second monitoring time window when the terminal is in the long DRX cycle.

In one embodiment, the first configuration information includes a first control resource set associated with a search space set, and the first control resource set is configured to indicate a resource occupied by the power-saving signal during the short DRX cycle; and the second configuration information includes a second control resource set associated with the search space set, and the second control resource set is configured to indicate a resource occupied by the power-saving signal during the long DRX cycle.

The processor is specifically configured to: monitor the power-saving signal by using a corresponding resource according to the first control resource set when being in the short DRX cycle; and monitor the power-saving signal by using a corresponding resource according to the second control resource set when being in the long DRX cycle.

In one embodiment, the first configuration information includes a first power-saving signal monitoring pattern, and the first power-saving signal monitoring pattern is a power-saving signal monitoring pattern used when the terminal is in the short DRX cycle; and the second configuration information includes a second power-saving signal monitoring pattern, and the second power-saving signal monitoring pattern is a power-saving signal monitoring pattern used when the terminal is in the long DRX cycle.

The processor is specifically configured to: monitor the power-saving signal on a corresponding time domain resource according to the first power-saving signal monitoring pattern when being in the short DRX cycle; and monitor the power-saving signal on a corresponding time domain resource according to the second power-saving signal monitoring pattern when being in the long DRX cycle.

A seventh aspect provides a computer readable storage medium. The computer readable storage medium stores a computer executable instruction, and the computer executable instruction is configured to cause a computer to execute any above method in the first aspect.

An eighth aspect provides a computer readable storage medium. The computer readable storage medium stores a computer executable instruction, and the computer executable instruction is configured to cause a computer to execute any above method in the second aspect.

In the above embodiments of the present disclosure, search space set configuration parameters for the power-saving signal are configured for the short DRX cycle and the long DRX cycle respectively, and the terminal can flexibly monitor the power-saving signal under the condition of configuring the short DRX cycle and the long DRX cycle at the same time, and the problem that the moment when the monitoring occasion for the power-saving signal appears is not matched with a start point of the active period (on-duration) of the DRX cycle due to dynamic change of the short DRX cycle and the long DRX cycle.

DETAILED DESCRIPTION OF THE EMBODIMENTS

An embodiment of the present disclosure provides a physical layer transmission design solution for a power-saving signal based on a PDCCH, which can be available for a behavior for monitoring the power-saving signal under the condition that a terminal is configured with a long DRX cycle and a short DRX cycle at the same time.

A DRX mechanism and configuration of a PDCCH monitoring occasion are illustrated below briefly and firstly.

Figure 1:
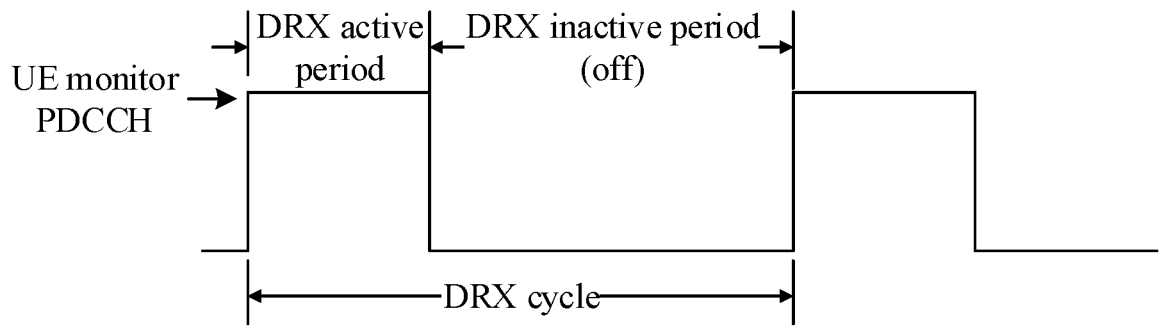
FIG. 1 exemplarily shows a schematic diagram of a DRX cycle.

FIG. 1 exemplarily shows a DRX cycle. One DRX cycle includes DRX active period (on-duration) and DRX inactive period (DRX off, also called opportunity for DRX). In one DRX cycle, the terminal only monitors the PDCCH in a DRX active period (on-duration), the terminal enters into a sleep mode in the DRX inactive period (opportunity for DRX) and does not receive the PDCCH under the mode to reduce power consumption.

DRX information (DRX-Info, namely, DRX parameters) specifically includes the following items.

DRX on-duration timer (drx-on-durationTimer): a duration for continuously monitoring the PDCCH from a start time the DRX cycle.

DRX slot offset (drx-SlotOffset): a delay before starting of the DRX on-duration timer.

DRX inactivity timer (drx-InactivityTimer): when the PDCCH indicates that there is new uplink (UL) or downlink (DL) data transmission, the DRX inactivity timer is started after receiving the PDCCH, and the terminal enters into an inactive state when the timer is time out.

—DRX retransmission timer for downlink (drx-RetransmissionTimerDL): for each downlink Hybrid Automatic Repeat reQuest (HARQ) progress, a maximum time duration before reaching of downlink retransmission data.

DRX retransmission timer for uplink (drx-RetransmissionTimerUL): for each uplink HARQ progress, a maximum time duration before reaching of uplink retransmission data.

Long DRX start offset (drx-LongCycleStartOffset): a start position of a long DRX cycle.

Long DRX cycle (drx-LongCycle): a time length of a cycle of long DRX, which is an integral multiple of a short DRX cycle.

Short DRX cycle (drx-ShortCycle): a time length of a cycle of short DRX, and this parameter is an optional parameter.

Short DRX cycle timer (drx-ShortCycleTimer): during running of the timer, the terminal adopts the short DRX cycle with a value being an integral multiple of the short DRX, and this parameter is an optional parameter.

DRX HARQ round trip time (RTT) timer for downlink (drx-HARQ-RTT-TimerDL): as for each downlink HARQ progress, a minimum duration before a media access control (MAC) entity needs to perform downlink HARQ retransmission.

DRX HARQ RTT for uplink (drx-HARQ-RTT-TimerUL): as for each uplink HARQ progress, a minimum duration before the MAC entity needs to perform uplink HARQ retransmission.

The terminal is in an active state during any running period of the DRX on-duration timer (drx-on-durationTimer), the DRX inactivity timer (drx-InactivityTimer), the DRX retransmission timer for downlink (drx-RetransmissionTimerDL) and the DRX retransmission timer for uplink (drx-RetransmissionTimerUL).

Under the condition that the terminal is configured with the short DRX cycle and the long DRX cycle at the same time, if the terminal receives an MAC control element (CE) carrying a DRX command (namely, DRX Command MAC CE, and CE represents a control unit), or when the DRX inactivity timer (drx-InactivityTimer) is time out, the terminal enters into a short DRX cycle, and starts or restarts the short DRX cycle timer (drx-ShortCycleTimer). When the short DRX cycle timer (drx-ShortCycleTimer) is time out, the terminal enters into the long DRX cycle. If there are new data reaching in the DRX active period, the terminal starts or restarts the DRX inactivity timer (drx-InactivityTimer).

The PDCCH monitoring occasion is configured in a search space set. One search space set is composed of a group of PDCCH candidates, and the terminal needs to perform blind detection on the PDCCH in the search space set according to an expected DCI format.

Configuration parameters for the search space set for the PDCCH may include the following.

An index of the search space set, namely, search space ID.
A control resource set serial number, namely, CORESET ID, for establishing a connection between the search space set s and a control resource set p.
A PDCCH monitoring periodicity $k_{p,s}$ and a PDCCH monitoring offset $o_{p,s}$, and units thereof are slot, and the terminal determines a slot(s) for monitoring the downlink control channel according to the configuration parameter.
A monitoring pattern of the PDCCH within the slot(s).
The quantity of PDCCH candidates contained by each aggregation level in the search space set $M_{p,z}^{(L)}$, and the supported aggregation level includes {1 2 4 8 16}, and is configured through independent parameters.
A mark searchspaceType configured to distinguish the current search space set is a common search space set or a terminal specific search space set.
A PDCCH monitoring time window, namely, the quantity of continuous slots existing in the search space set.

A power-saving signal is introduced before the DRX active period (on-duration), to dynamically indicate the terminal whether to perform PDCCH monitoring during the active period of the next one or more DRX cycles. The power-saving signal is a PDCCH-based physical layer signal, and the process for monitoring the power-saving signal is consistent with a behavior for monitoring the PDCCH for user scheduling.

According to above description, the PDCCH monitoring occasion is cyclical and has a fixed value, and the PDCCH may be possibly received at each PDCCH monitoring occasion. If the terminal is configured with the long DRX cycle and the short DRX cycle at the same time, the cycle for monitoring the power-saving signal based on the PDCCH will be influenced, and the influence includes the following.

(1) If the cycle for monitoring the power-saving signal based on the PDCCH is configured according to the short DRX cycle, the long DRX cycle will include PDCCH monitoring occasions, that is, the monitoring for the power-saving signal will be performed multiple times within one PDCCH monitoring, to cause the terminal to generate unnecessary power consumption.

(2) If the cycle for monitoring the power-saving signal based on the PDCCH is configured according to the long DRX cycle, because data reaching is bursty, the start or restart moments of the short DRX cycle timer (drx-ShortCycleTimers) is unfixed, to lead to unfixed moment for starting the long DRX cycle monitoring by the terminal. The terminal monitors the power-saving signal according to the long DRX cycle, and consequently, there will be no monitoring occasion for the power-saving signal before the active period (on-duration) of the long DRX cycle, or a time offset from the monitoring occasion for the power-saving signal to the active period (on-duration) of the long DRX cycle is long.

In order to solve the above problem, an embodiment of the present disclosure provides a physical layer transmission design solution of a power-saving signal based on a PDCCH, which can be available for a behavior for monitoring the power-saving signal under the condition that the terminal is configured with the long DRX cycle and the short DRX cycle at the same time.

In the embodiment of the present disclosure, as for the condition that the terminal is configured with the two types of DRX cycles, namely, the long DRX cycle and the short DRX cycle, the several following solutions are provided.

Solution 1: search space set configuration information for the power-saving signal used when being in the short DRX cycle is configured for the terminal, the power-saving signal is monitored by using the configuration information when the terminal is in the short DRX cycle, and the power-saving signal is not monitored when the terminal is in the long DRX cycle.

Solution 2: search space set configuration information for the power-saving signal used when being in the long DRX cycle is configured for the terminal, the power-saving signal is monitored by using the configuration information when the terminal is in the long DRX cycle, and the power-saving signal is not monitored when the terminal is in the short DRX cycle.

Solution 3: the search space set configuration information for the power-saving signal used when being in the short DRX cycle and the search space set configuration information for the power-saving signal used when being in the long DRX cycle are configured for the terminal, and the power-saving signal is monitored by the terminal by using the different configuration information when the terminal is in the short DRX cycle and the long DRX cycle.

For example, two monitoring periodicities may be configured for the terminal, namely, a first monitoring periodicity T1 and a second monitoring periodicity T2, and a value of the first monitoring periodicity T1 is an integral multiple of the short DRX cycle, that is, T1=N×the time length of short DRX cycle, and N is an integer and N and a value of the second monitoring periodicity T2 is an integral multiple of the long DRX cycle, that is, T2=M×the time length of long DRX cycle, and M is an integer and M≥1. The power-saving signal may be monitored by adopting the different monitoring periodicities when the terminal is in the different DRX cycles. That is, the power-saving signal is monitored by adopting the first monitoring periodicity T1 when the terminal is in the short DRX cycle; and the power-saving signal is monitored by adopting the second monitoring periodicity T2 when the terminal is in the long DRX cycle. By adopting the embodiment of the present disclosure, the monitoring occasion for the power-saving signal may be matched with the active period of the DRX under the condition that the terminal is configured with the long DRX cycle and the short DRX cycle at the same time.

The embodiment of the present disclosure are firstly illustrated below.

The "terminal" in the embodiment of the present disclosure, is also called user equipment (UE), a mobile station (MS), a mobile terminal (MT) and the like, is a device for providing voice and/or data connectivity for a user, for example, a handheld device, a vehicle-mounted device and other devices with a wireless connecting function. At present, some examples of the terminal are: a mobile phone, a tablet computer, a notebook computer, a palm computer, a mobile internet device (MID), a wearable device, a virtual reality (VR) device, an augmented reality (AR) device, a wireless terminal in industrial control, a wireless terminal in self driving, a wireless terminal in remote medical surgery, a wireless terminal in a smart grid, a wireless terminal in transportation safety, a wireless terminal in a smart city, a wireless terminal in a smart home and the like.

The "base station" in the embodiment of the present disclosure may be an RAN node or base station. RAN is a part in a network for accessing the terminal into a wireless network. The RAN node (or device) is a node (or device) in a radio access network, and may also be called the base station. At present, some examples of the RAN node are: gNB, a transmission reception point (TRP), an evolved Node B (eNB), a radio network controller (RNC), a Node B (NB), a base station controller (BSC), a base transceiver station (BTS), a femto (such as a home evolved NodeB or a home Node B (HNB)), a base band unit (BBU), or a wireless fidelity (Wifi) access point (AP), and the like. In addition, in a network structure, the RAN may include a centralized unit (CU) node and a distributed unit (DU) node.

It should be understood that the terms "first", "second" and the like in the embodiment of the present disclosure are configured to distinguish similar objects, and are not necessarily configured to describe a specific order or a precedence order. It should be understood that data used in this way may be interchanged where appropriate, for example, may be implemented according to sequences other than those given in graphical representation or description in the embodiment of the present disclosure.

Figure 2:
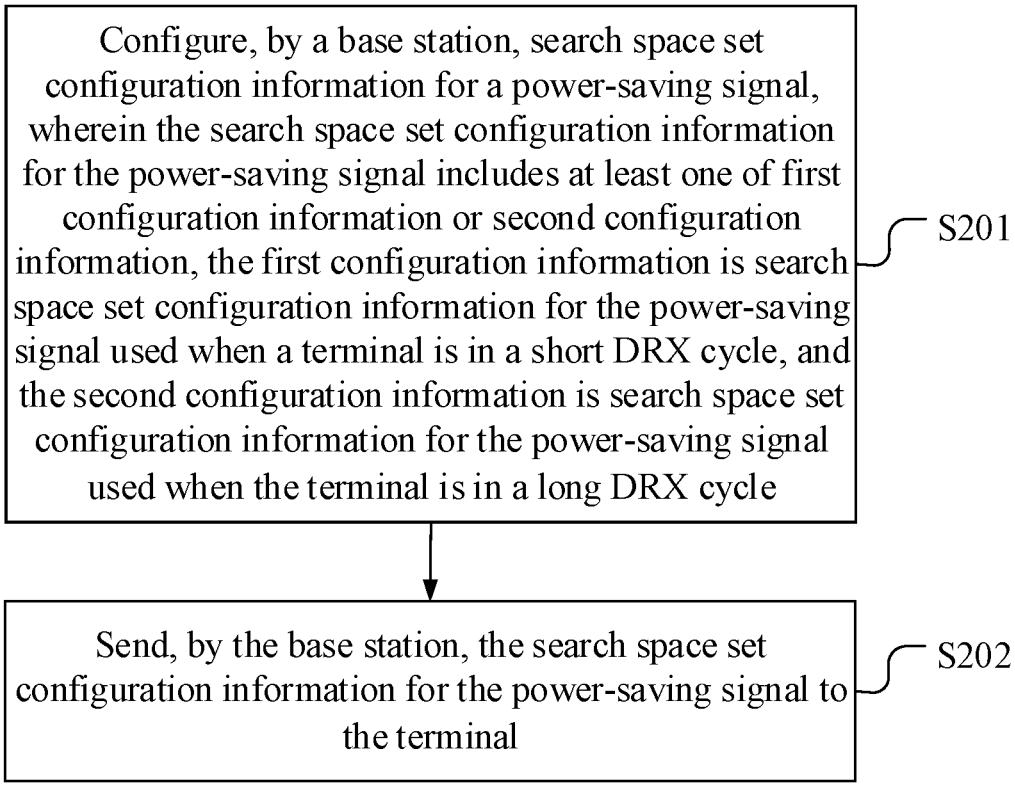
FIG. 2 exemplarily shows a schematic diagram of a power-saving signal configuration flow implemented on a base station side in an embodiment of the present disclosure.

Referring to FIG. 2, which is a schematic diagram of a configuration flow of a power-saving signal provided by an embodiment of the present disclosure. As shown in the figure, the flow may include the following.

S201: a base station configures search space set configuration information for a power-saving signal.

The search space set configuration information for the power-saving signal includes at least one of first configuration information and second configuration information. The first configuration information is search space set configuration information for the power-saving signal used when a terminal is in a short DRX cycle, and the second configuration information is configuration information for a search space set for the power-saving signal used when the terminal is in a long DRX cycle.

S202: the base station sends the search space set configuration information for the power-saving signal to the terminal.

The flow as shown in above FIG. 2 may further include the following steps.

The base station determines a DRX cycle (that is, the DRX cycle where the terminal is located is the short DRX cycle or the long DRX cycle) where the terminal is located according to DRX configuration information and a data transmitting condition of the terminal, determines a monitoring occasion (for example, a start position for monitoring the power-saving signal and a slot length for continuously monitoring the power-saving signal) for the power-saving signal according to the DRX cycle where the terminal is located and the search space set configuration information for the power-saving signal, and send the power-saving signal according to the monitoring occasion for the power-saving signal.

According to the flow as shown in above FIG. 2, the base station may configure the search space set configuration information for the power-saving signal for at least one of the short DRX cycle and the long DRX cycle. The following several conditions may be included:

Condition 1: the first configuration information is only configured for the short DRX cycle. The power-saving signal is monitored by using the first configuration information when the terminal is in the short DRX cycle, and the power-saving signal is not monitored when the terminal is in the long DRX cycle.

Condition 2: the second configuration information is only configured for the long DRX cycle. The power-saving signal is monitored by using the second configuration information when the terminal is in the long DRX cycle, and the power-saving signal is not monitored when the terminal is in the short DRX cycle.

Condition 3: the first configuration information is configured for the short DRX cycle, and the second configuration information is configured for the long DRX cycle. The power-saving signal is monitored by using the first configuration information when the terminal is in the short DRX cycle, and the power-saving signal is monitored by using the second configuration information when the terminal is in the long DRX cycle.

It can be seen from the above description that in the above embodiment of the present disclosure, search space set configuration parameters for the power-saving signal are configured for the short DRX cycle and the long DRX cycle respectively, and the terminal can flexibly monitor the power-saving signal under the condition of configuring the short DRX cycle and the long DRX cycle at the same time, and the problem that a moment at which the monitoring occasion for the power-saving signal appears is not matched with a start point of an active period (on-duration) of the DRX cycle due to dynamic change of the short DRX cycle and the long DRX cycle.

In one embodiment, in the search space set configuration information for the power-saving signal, the first configuration information may include a first monitoring periodicity T1, and the second configuration information may include a second monitoring periodicity T2. The first monitoring periodicity T1 is a monitoring periodicity for the power-saving signal used when the terminal is in the short DRX cycle, and the second monitoring periodicity T2 is a monitoring periodicity for the power-saving signal when the terminal is in the long DRX cycle.

The first monitoring periodicity T1 is N times (N is an integer greater than or equal to 0) of the short DRX cycle, that is a value T1 of the first monitoring periodicity=N×the time length of the short DRX cycle, and N is an integer and $N \geq 0$; and the second monitoring periodicity T2 is M times (M is an integer greater than or equal to 1) of the long DRX cycle, that is, a value T2 of the second monitoring periodicity=M×the time length of the long DRX cycle, and M is an integer and $M \geq 1$.

When N=0, it represents that the power-saving signal is not monitored when the terminal is in the short DRX cycle.

In one embodiment, at least one of the first monitoring periodicity T1 and the second monitoring periodicity T2 may also be not contained in the search space set configuration information for the power-saving signal, but is implicitly indicated to the terminal by the base station. Specifically, the short DRX cycle configured by the base station for the terminal may be associated with the first monitoring periodicity T1, and the long DRX cycle configured by the base station for the terminal may be associated with the second monitoring periodicity T2. That is to say, the terminal may obtain the time length of the first monitoring periodicity T1 (T1=N×the time length of the short DRX cycle) associated with the time length of the short DRX cycle configured by the base station for the terminal according to the time length of the short DRX cycle, and the terminal may obtain the time length of the second monitoring periodicity T2 (T2=M×the time length of the long DRX cycle) associated with the time length of the long DRX cycle configured by the base station for the terminal according to the time length of the long DRX cycle.

Under the condition that the two different monitoring periodicities (the first monitoring periodicity T1 and the second monitoring periodicity T2) for the power-saving signal are configured for the short DRX cycle and the long DRX cycle respectively, the power-saving signal may be monitored according to the monitoring occasion corresponding to the first monitoring periodicity T1 when the terminal is in the short DRX cycle, and the power-saving signal may be monitored according to the monitoring occasion corresponding to the second monitoring periodicity T2 when the terminal is in the long DRX cycle, and the terminal can flexibly monitor the power-saving signal under the condition of configuring the short DRX cycle and the long DRX cycle at the same time, and the problem that the moment when the monitoring occasion for the power-saving signal appears is not matched with the start point of the active period (on-duration) of the DRX cycle due to dynamic change of the short DRX cycle and the long DRX cycle is solved. It may be specifically embodied in the following two aspects.

A first aspect, in a conventional solution, if the monitoring periodicity for the power-saving signal based on a PDCCH is configured according to the short DRX cycle, the long DRX cycle contains PDCCH monitoring occasions, that is, the monitoring for the power-saving signal will be performed multiple times within one long DRX cycle, to cause the terminal to generate unnecessary power consumption. While by adopting the above embodiment of the present disclosure, the power-saving signal is monitored by using the monitoring occasion corresponding to the second monitoring periodicity T2 in the long DRX cycle, the second monitoring periodicity T2 is a multiple of the short DRX monitoring cycle T1, for example, the power-saving signal is monitored every multiple short DRX cycles, here a length of the multiple short DRX cycles is equal to one long DRX cycle, in this way, the monitoring occasion for the power-saving signal contained in the long DRX cycle is less than the PDCCH monitoring occasion, therefore, compared with the above conventional solution, unnecessary power consumption generated by the terminal may be reduced.

A second aspect, in the conventional solution, if the monitoring periodicity for the power-saving signal based on the PDCCH is configured according to the long DRX cycle, because data reaching is bursty, the DRX inactivity timer (drx-InactivityTimer) is started after data reaching, the short DRX cycle timer (drx-ShortCycleTimer) is started or restarted after the DRX inactivity timer is time out, and therefore, the moment for starting or restarting the short DRX cycle timer (drx-ShortCycleTimer) is unfixed. When the short DRX cycle timer (drx-ShortCycleTimer) is time out, the terminal enters into the long DRX cycle, to cause the moment for monitoring the power-saving signal by the terminal to be not matched with a start point of the active period of the long DRX cycle. In this way, the terminal monitors the power-saving signal according to the long DRX cycle, and consequently, there may be no monitoring occasion for the power-saving signal before the active period (on-duration) of the long DRX cycle, or a time offset from the monitoring occasion for the power-saving signal to the active period (on-duration) of the long DRX cycle is long. While by adopting the above embodiment of the present disclosure, the terminal does not always monitor the power-saving signal according to the long DRX cycle, but monitors the power-saving signal within the short DRX cycle according to the monitoring occasion corresponding to the first monitoring periodicity T1, and monitors the power-saving signal within the long DRX cycle according to the monitoring occasion corresponding to the second monitoring periodicity T2. The first monitoring periodicity T1 may be several times of the short DRX monitoring cycle, and the second monitoring periodicity T2 may be several times of the long DRX monitoring cycle. Compared with the above conventional solution, when the terminal is in the long DRX cycle, the terminal monitors the power-saving signal according to the monitoring occasion related to the long DRX cycle, thus it may be ensured that the power-saving signal can be received before the active period of each long DRX cycle, it may also be prevented that the time offset from the monitoring occasion for the power-saving signal to the active period (on-duration) of the long DRX cycle is long, to improve the possibility of receiving the power-saving signal, and reducing unnecessary power consumption generated by the terminal.

In one embodiment, in some embodiments, in the search space set configuration information for the power-saving signal, the first configuration information may include a first monitoring occasion offset offset_1, and the second configuration information may include a second monitoring occasion offset offset_2. The first monitoring occasion offset offset_1 and the second monitoring occasion offset offset_2 respectively correspond to the short DRX cycle and the long DRX cycle. The first monitoring occasion offset offset_1 is a monitoring occasion offset of the power-saving signal used when the terminal is in the short DRX cycle, and the second monitoring occasion offset offset_2 is a monitoring occasion offset of the power-saving signal used when the terminal is in the long DRX cycle. That is, when the terminal is in the short DRX cycle, an offset amount for monitoring the power-saving signal is the first monitoring occasion offset offset_1, and when the terminal is in the long DRX cycle, an offset amount for monitoring the power-saving signal is the second monitoring occasion offset offset_2. The different monitoring offsets are configured for the short DRX cycle and the long DRX cycle, and the monitoring occasion for the power-saving signal may be configured more flexibly as for power-saving signal monitoring complexity and reliability needed by the different DRX cycles.

In one embodiment, the units of the first monitoring occasion offset offset_1 and the second monitoring occasion offset offset_2 may be slots. Taking an example that the slot serves as the unit, the start position of the monitoring occasion for the power-saving signal during the short DRX cycle may be determined according to the first monitoring occasion offset offset_1, and the start position of the monitoring occasion for the power-saving signal during the long DRX cycle may be determined according to the second monitoring occasion offset offset_2.

In one embodiment, units of the first monitoring occasion offset offset_1 and the second monitoring occasion offset offset_2 may be the slots.

Taking an example that the slot serves as the unit, the first monitoring occasion offset needs to meet the following relation:

$$o_{s\text{-}DRX} \bmod(k_{s\text{-}shortDRX}) - \text{offset\_1} \bmod(k_{s\text{-}shortDRX}) =$$
$$\text{offset\_short}, \quad \text{if} \quad \text{offset\_short} \leq o_{s\text{-}DRX}$$
$$\bmod(k_{s\text{-}shortDRX}), \quad k_{s\text{-}shortDRX} + \text{offset\_1} \bmod$$
$$(k_{s\text{-}shortDRX}) - \text{offset\_1} \quad \bmod(k_{s\text{-}shortDRX}) =$$
$$\text{offset\_short}, \text{else}$$

That is, a time offset is between a start time point of a first short DRX cycle within the monitoring periodicity and the power-saving signal (the time offset may also be called the time offset from the monitoring occasion for the power-saving signal to the short DRX cycle, namely, the time offset from the monitoring occasion for the power-saving signal to the active period of the short DRX cycle).

The above formula represents as below.

If offset_short≤$o_{s\text{-}DRX}$ mod($k_{s\text{-}shortDRX}$) the first monitoring occasion offset meets the following relation:

$o_{s\text{-}shortDRX}$+offset_1 mod($k_{s\text{-}shortDRX}$)−offset_1 mod ($k_{s\text{-}shortDRX}$)=offset_short.

Under other conditions, the first monitoring occasion offset meets the following relation:

$k_{s\text{-}shortDRX}$+offset_1 mod($k_{s\text{-}shortDRX}$)−offset_1 mod ($k_{s\text{-}shortDRX}$)=offset_short.

Where, $O_{s\text{-}DRX}$ is long DRX start offset, $k_{s\text{-}shortDRX}$ is the short DRX cycle, A mod(B) represents mode operation of mode B on an A value, offset_1 is the first monitoring occasion offset, and offset_short is a time offset from the power-saving signal to the short DRX cycle (hereinafter referred to as the first time offset).

The second monitoring occasion offset needs to meet the following relation:

$$\begin{cases} o_{s-DRX} - \text{offset\_2 mod } (k_{s-longDRX}) = \\ \quad \text{offset\_long,} \\ k_{s-long DRX} + o_{s-DRX} - \\ \quad \text{offset\_2 mod } (k_{s-longDRX}) = \\ \quad \text{offset\_long,} \end{cases} \begin{matrix} \text{if offset\_long} \le o_{s-DRX} \\ \\ \text{else} \end{matrix}.$$

That is, a time offset is between the power-saving signal and a start time of a first long DRX cycle within the monitoring periodicity (the time offset may also be called the time offset from the monitoring occasion for the power-saving signal to the long DRX cycle, namely, the time offset from the monitoring occasion for the power-saving signal to the active period of the long DRX cycle).

The above formula represents as below.

If offset_long≤$o_{s\text{-}DRX}$, the second monitoring occasion offset meets the following relation:

$o_{s\text{-}DRX}$−offset_2 mod($k_{s\text{-}longDRX}$)=offset_long.

Under other conditions, the second monitoring occasion offset meets the following relation:

$k_{s\text{-}longDRK}$+$o_{s\text{-}DRX}$−offset_2 mod($k_{s\text{-}longDRX}$)=offset_long.

Where, $O_{s\text{-}DRX}$ is long DRX start offset, offset_2 is the second monitoring occasion offset, and offset_long is a time offset from the power-saving signal to the long DRX cycle (hereinafter referred to as the second time offset).

In one embodiment, values of the first monitoring occasion offset offset_1 and the second monitoring occasion offset offset_2 may be the same or different.

In one embodiment, the first time offset offset_short (namely, the time offset from the power-saving signal to the short DRX cycle) may be singly configured by a high-level signaling, and may also be implicitly indicated through the first monitoring occasion offset configured in the search space set configuration information for the power-saving signal. That is, through the above defined relation between the power-saving signal and the short DRX cycle, the first time offset offset_short may be determined through the first monitoring occasion offset without additionally configuring the first time offset offset_short, and only the relation needing to be met by the first monitoring occasion offset and the first time offset offset_short needs to be appointed or configured. The first time offset offset_short and the first monitoring occasion offset of the power-saving signal may also be configured at the same time.

In one embodiment, the second time offset offset_long (namely, the time offset from the power-saving signal to the long DRX cycle) may be singly configured by a high-level signaling, and may also be implicitly indicated through the second monitoring occasion offset configured in the search space set configuration information for the power-saving signal. That is, through the above defined relation between the power-saving signal and the long DRX cycle, the second time offset offset_long may be determined through the second monitoring occasion offset without additionally configuring the second time offset offset_long, and only the relation needing to be met by the second monitoring occasion offset and the second time offset offset_long needs to be appointed or configured. The second time offset offset_long and the second monitoring occasion offset for the power-saving signal may also be configured at the same time.

In one embodiment, in some embodiments, in the search space set configuration information for the power-saving signal, the first configuration information may include a first monitoring time window duration_1, and the second configuration information may include a second monitoring time window duration_2. The first monitoring time window duration_1 and the second monitoring time window duration_2 respectively correspond to the short DRX cycle and the long DRX cycle, and configured to indicate a time length for continuously monitoring the power-saving signal. The different monitoring time windows are configured for the short DRX cycle and the long DRX cycle, the monitoring occasion for the power-saving signal may be configured more flexibly, the time window may be configured according to needs during specific implementation, to give consideration to both reliability of power-saving signal transmission and effectively utilization of system resources.

Specifically, the first monitoring time window duration_1 is a slot length for continuously monitoring the power-saving signal before the DRX active period when the terminal is in the short DRX cycle, and the second monitoring time window duration_2 is a slot length for continuously monitoring the power-saving signal before the DRX active period when the terminal is in the long DRX cycle. That is, when the terminal is in the short DRX cycle, a continuous duration for monitoring the power-saving signal before the active period (on-duration) of the short DRX cycle is duration_1, and when the terminal is in the long DRX cycle, a continuous duration for monitoring the power-saving signal before the active period (on-duration) of the long DRX cycle is duration 2. Values of the duration_1 and the duration_2 may be the quantity of the slots.

In one embodiment, values of the first monitoring time window duration_1 and the second monitoring time window duration_2 may be the same or different.

In one embodiment, in some embodiments of the present disclosure, in the search space set configuration information for the power-saving signal, the first configuration information may include a first control resource set CORESET_1, and the second configuration information may include a second control resource set CORESET_2. The first control resource set CORESET_1 and the second control resource set CORESET_2 respectively correspond to the short DRX cycle and the long DRX cycle. The different control resource sets are configured for the short DRX cycle and the long DRX cycle, time frequency resources used by the power-saving signal may be configured more flexibly, the control resource set may be configured according to needs during specific implementation, to give consideration to both reliability of power-saving signal transmission and effectively utilization of system resources.

The first control resource set CORESET_1 is resources occupied by the power-saving signal during the short DRX cycle, may include time domain resources or frequency domain resources or beams and the like, and may also include both the frequency domain resources and the time domain resources as well as the beams; and the second control resource set CORESET_2 is resources occupied by the power-saving signal during the long DRX cycle, may include time domain resources or frequency domain resources or beams, and may also include both the frequency domain resources and the time domain resources as well as the beams.

In one embodiment, the first control resource set CORESET_1 and the second control resource set CORESET_2 may be the same resource set or the different resource sets.

In one embodiment, in some embodiments, in the search space set configuration information for the power-saving signal, the first configuration information may include a first power-saving signal monitoring pattern pattern_1, and the second configuration information may include a second power-saving signal monitoring pattern pattern_2. The first power-saving signal monitoring pattern pattern_1 and the second power-saving signal monitoring pattern pattern_2 respectively correspond to the short DRX cycle and the long DRX cycle. That is, the first power-saving signal monitoring pattern pattern_1 is a power-saving signal monitoring pattern used when the terminal is in the short DRX cycle, and the second power-saving signal monitoring pattern pattern_2 is a power-saving signal monitoring pattern used when the terminal is in the long DRX cycle. The different power-saving signal monitoring patterns are configured for the short DRX cycle and the long DRX cycle, the time frequency resources used by the power-saving signal may be configured more flexibly, the power-saving signal monitoring pattern may be configured according to needs during specific implementation, to give consideration to both the reliability of power-saving signal transmission and effectively utilization of the system resources.

The power-saving signal monitoring pattern may be configured to indicate the time frequency resource occupied by the power-saving signal, for example, may indicate a start symbol for the power-saving signal in one slot and the symbol quantity for continuous transmitting the start symbol starting from the start symbol.

In one embodiment, the first power-saving signal monitoring pattern pattern_1 and the second power-saving signal monitoring pattern pattern_2 may be the same or different.

In one embodiment, in some embodiments of the present disclosure, the base station may configure the search space set configuration information for the power-saving signal described by the above one embodiment of combination of embodiments in one search space set or the two search space sets.

In one embodiment, if being configured in one search space set, the search space set configuration information for the search space set includes the above first configuration information, or includes the above second configuration information, or includes the above first configuration information and second configuration information.

In one embodiment, if being configured at the two search space sets (the first search space set and the second search space set), the first search space set corresponds to the short DRX cycle, the search space set configuration information corresponding to the first search space set contains the first configuration information, for example, contains the above first monitoring periodicity T1, and may further contain one or more of the above first monitoring occasion offset offset_1, the first monitoring time window duration_1, the first control resource set CORESET_1 or the first power-saving signal monitoring pattern pattern_1; and the second search space set corresponds to the long DRX cycle, the search space set configuration information corresponding to the second search space set contains the second configuration information, for example, contains the above second monitoring periodicity T2, and may further contain one or more of the above second monitoring occasion offset offset_2, the second monitoring time window duration_2, the second control resource set CORESET_2 or the second power-saving signal monitoring pattern pattern_2.

In one embodiment, in some embodiments, under the condition of using beams (means at least two, and beams may be the plurality of beams in the same direction or the plurality of beams in the different directions) to send the power-saving signal, and the base station may adopt one of the two followings modes to configure the search space set configuration information for the power-saving signal.

Mode 1: the base station configures one search space set for each beam in beams, and the search space set configuration information corresponding to each search space set includes at least one of the first configuration information or the second configuration information.

Taking an example that the three beams are used to send the power-saving signal, the base station configures the search space set 1, the search space set 2 and the search space set 3 for the power-saving signal. The search space set configuration information corresponding to the search space set 1 includes the first configuration information (namely, the search space set configuration information for the power-saving signal used when the terminal is in the short DRX cycle), and the second configuration information (namely, the search space set configuration information for the power-saving signal used when the terminal is in the long DRX cycle). The search space set configuration information corresponding to the search space set 2 and the search space set 3 also includes the first configuration information and second configuration information respectively. Specific description of the first configuration information and the second configuration information may refer to the aforementioned embodiments.

Mode 2: the base station configures the first search space set and the second search space set for each beam in beams, and the search space set configuration information corresponding to the first search space set includes the first configuration information, and the search space set configuration information corresponding to the second search space set includes the second configuration information.

Taking an example that the three beams are used to send the power-saving signal, the base station configures the six search space sets (search space sets 1-6) for the power-saving signal, and the search space set 1 and the search space set 2 correspond to the same beam (a control resource set associated with the search space set 1 and a control resource set associated with the search space set 2 correspond to the same beam), the search space set 3 and the search space set 4 correspond to the same beam, and the search space set 5 and the search space set 6 correspond to the same beam. The search space set configuration information corresponding to the search space set 1, the search space set 3 and the search space set 5 includes the first configuration information (namely, the search space set configuration information for the power-saving signal used when the terminal is in the short DRX cycle), and the search space set configuration information corresponding to the search space set 2, the search space set 4 and the search space set 6 includes the second configuration information (namely, the search space set configuration information for the power-saving signal used when the terminal is in the long DRX cycle). Specific description of the first configuration information and the second configuration information may refer to the aforementioned embodiments.

Further, the base station may further send the high-level signaling to the terminal, and the high-level signaling is configured to notify the one or two time offsets associated with each of search space sets. If the one search space set is associated with one time offset, the time offset is a time offset from the monitoring occasion for the power-saving signal shared when the terminal is in the short DRX cycles or the long DRX cycles to the short DRX cycle; if the one search space set is associated with the two time offsets, a first time offset in the two time offsets is the time offset from the monitoring occasion for the power-saving signal used when the terminal is in the short DRX cycle to the short DRX cycle, and a second time offset in the two time offsets is a time offset from the monitoring occasion for the power-saving signal used when the terminal is in the long DRX cycle to the long DRX cycle.

It should be noted that the above embodiments at a base station side may be independently used, or be freely combined, which is not limited by the present disclosure.

For example, the search space set configuration information for the power-saving signal configured by the base station includes two monitoring periodicities, and besides, may further include one or more of the following information (parameters).

Monitoring occasion offset, and there may be one or two (the condition of two may refer to the aforementioned embodiments) monitoring occasion offset parameters, if there is one monitoring occasion offset parameter, the terminal uses the same monitoring occasion offset parameter during the short DRX cycle and the long DRX cycle.

A monitoring time window, and there may be one or two (the condition of two may refer to the aforementioned embodiments) monitoring time window parameters, if there is one monitoring time window parameter, the terminal uses the same monitoring time window parameter during the short DRX cycle and the long DRX cycle.

A control resource set, and there may be one or two (the condition of two may refer to the aforementioned embodiments) control resource sets, if there is one control resource set, the terminal uses the same control resource set during the short DRX cycle and the long DRX cycle.

A monitoring pattern, and there may be one or two (the condition of two may refer to the aforementioned embodiments) monitoring patterns, if there is one monitoring pattern, the terminal uses the same monitoring pattern during the short DRX cycle and the long DRX cycle.

In one embodiment, the base station may further additionally configure the time offset from the power-saving signal to the DRX cycle, to achieve the monitoring occasion offset for the power-saving signal. The time offset from the power-saving signal to the DRX cycle may be one information field additionally added in the search space set configuration information for the power-saving signal, or may be parameter configuration exclusive for the power-saving signal in the high-level signaling of the base station.

There may be one or two (the two time offsets, namely, the "time offset from the power-saving signal to the DRX cycle" respectively corresponding to the short DRX cycle and the long DRX cycle) time offsets from the power-saving signal to the DRX cycle. If there is one time offset from the power-saving signal to the DRX cycle, the terminal uses the same time offset for monitoring the power-saving signal during the short DRX cycle and the long DRX cycle. If the base station is configured with the time offset from the power-saving signal to the DRX cycle, the monitoring occasion offset in the search space set configuration information for the power-saving signal may be defaulted.

It should be noted that the above only exemplarily list several possible conditions, and the embodiment of the present disclosure does not be limited to the above listed several conditions.

It should be noted that the above search space set configuration parameters for the power-saving signal may be configured by expanding PDCCH search space set configuration parameters or multiplexing PDCCH search space set configuration parameters. The above search space set configuration parameters for the power-saving signal may also be configured independent of a PDCCH search space set configuration process.

The terminal receives PDCCH search space set configuration information sent by the base station, and monitors the power-saving signal and PDCCH according to the PDCCH search space set configuration information.

Figure 3:
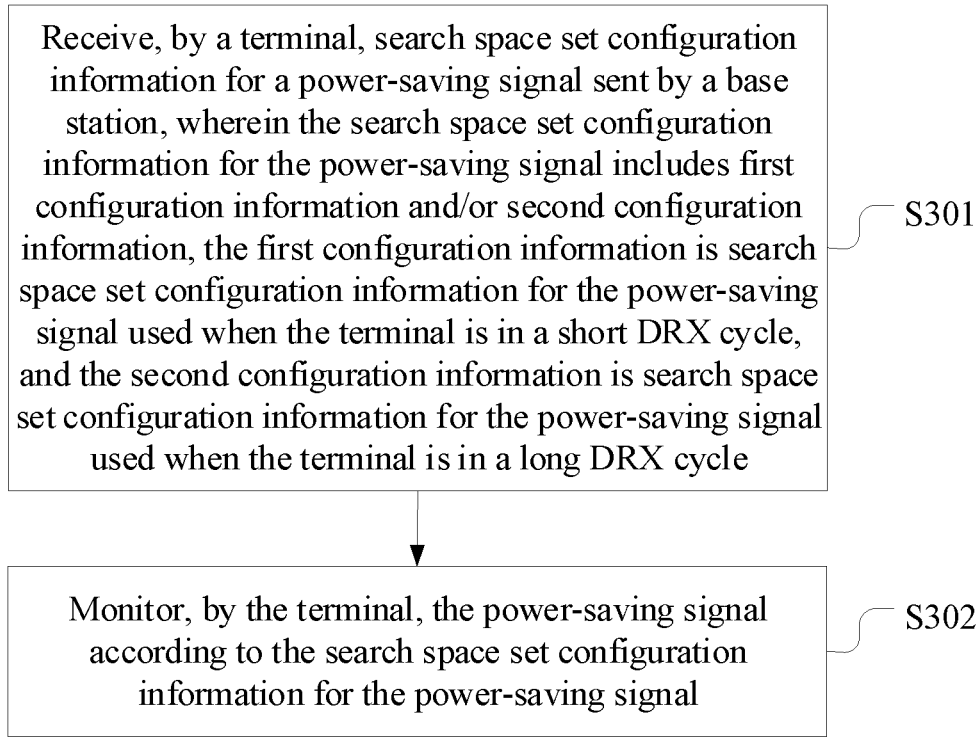
FIG. 3 exemplarily shows a schematic diagram of a power-saving signal reception flow implemented on a terminal side in an embodiment of the present disclosure.

Referring to FIG. 3, which is a schematic diagram of a power-saving signal reception flow provided by an embodiment of the present disclosure. The flow may include the following.

S301: the terminal receives the search space set configuration information for the power-saving signal sent by the base station.

The search space set configuration information for the power-saving signal includes first configuration information and/or second configuration information, the first configuration information is search space set configuration information for the power-saving signal used when the terminal is in a short DRX cycle, and the second configuration information is search space set configuration information for the power-saving signal used when the terminal is in a long DRX cycle. The contained content and the sending mode of the search space set configuration information for the power-saving signal may refer to the aforementioned embodiment, which is not repeated here.

S302: The terminal monitors the power-saving signal according to the search space set configuration information for the power-saving signal.

The monitoring, by the terminal, the power-saving signal according to the search space set configuration information for the power-saving signal, may include the following several conditions.

Condition 1: the power-saving signal is monitored by using the first configuration information when the terminal is in the short DRX cycle, and the power-saving signal is not monitored when the terminal is in the long DRX cycle.

Condition 2: the power-saving signal is monitored by using the second configuration information when the terminal is in the long DRX cycle, and the power-saving signal is not monitored when the terminal is in the short DRX cycle.

Condition 3: the power-saving signal is monitored by using the first configuration information when the terminal is in the short DRX cycle, and the power-saving signal is monitored by using the second configuration information when the terminal is in the long DRX cycle.

In one embodiment, the first configuration information includes a first monitoring periodicity, the first monitoring periodicity is N times of the short DRX cycle, and N is an integer greater than or equal to 0; and the second configuration information includes a second monitoring periodicity, the second monitoring periodicity is M times of the long DRX cycle, and M is an integer greater than or equal to 1. In S302, in the above condition 1 and condition 3, the power-saving signal is monitored by using the first monitoring periodicity when the terminal is in the short DRX cycle; and in the above condition 2 and condition 3, the power-saving signal is monitored by using the second monitoring periodicity when the terminal is in the long DRX cycle.

In one embodiment, in some embodiments, at least one of the first monitoring periodicity and the second monitoring periodicity may be implicitly indicated to the terminal. Specifically, the first monitoring periodicity for the power-saving signal used when the terminal is in the short DRX cycle is associated with the short DRX cycle for the terminal; and the second monitoring periodicity for the power-saving signal used when the terminal is in the long DRX cycle is associated with the long DRX cycle for the terminal.

In one embodiment, if the search space set configuration information for the power-saving signal includes a first monitoring occasion offset offset_1 and second monitoring occasion offset offset_2, when the terminal is in the short DRX cycle, a start position of the monitoring occasion for the power-saving signal is determined according to the first monitoring occasion offset offset_1, and the power-saving signal is started to be monitored at the position; and when the terminal is in the long DRX cycle, a start position of the monitoring occasion for the power-saving signal is determined according to the second monitoring occasion offset offset_2, and the power-saving signal is started to be monitored at the position.

In one embodiment, if the search space set configuration information for the power-saving signal includes a first time offset offset_short and a second time offset offset_long, when the terminal is in the short DRX cycle, a start position of the monitoring occasion for the power-saving signal is determined according to the first time offset offset_short, and the power-saving signal is started to be monitored at the position; and when the terminal is in the long DRX cycle, a start position of the monitoring occasion for the power-saving signal is determined according to the second time offset offset_long, and the power-saving signal is started to be monitored at the position.

In one embodiment, the first time offset offset_short and the second time offset offset_long may also be notified by the base station through a signaling.

In one embodiment, if the search space set configuration information for the power-saving signal includes a first monitoring time window duration_1 and a second monitoring time window duration_2, when the terminal is in the short DRX cycle, the power-saving signal is monitored within a corresponding time length before an active period of the short DRX cycle according to the first monitoring time window duration_1; and when the terminal is in the long DRX cycle, the power-saving signal is monitored within a corresponding time length before an active period of the long DRX cycle according to the second monitoring time window duration 2.

In one embodiment, if the search space set configuration information for the power-saving signal further includes a first control resource set CORESET_1 and a second control resource set CORESET_2 associated with a search space set, when the terminal is in the short DRX cycle, the power-saving signal is monitored within a time frequency resource corresponding to the first control resource set CORESET_1; and when the terminal is in the long DRX cycle, the power-saving signal is monitored within a time frequency resource corresponding to the second control resource set CORESET_2.

In one embodiment, if the search space set configuration information for the power-saving signal includes a first power-saving signal monitoring pattern pattern_1 and a second power-saving signal monitoring pattern pattern_2, when the terminal is in the short DRX cycle, the power-saving signal is monitored according to the first power-saving signal monitoring pattern pattern_1; and when the terminal is in the long DRX cycle, the power-saving signal is monitored according to the second power-saving signal monitoring pattern pattern_2.

It should be noted that the above embodiments at a terminal side may be independently used, or be freely combined, which is not limited by the present disclosure.

In the above embodiments of the present disclosure, search space set configuration parameters for the power-saving signal are configured for the short DRX cycle and the long DRX cycle respectively, and the terminal can flexibly monitor the power-saving signal under the condition of configuring the short DRX cycle and the long DRX cycle at the same time, and the problem that a moment when the monitoring occasion for the power-saving signal appears is not matched with a start point of the active period of the DRX cycle due to dynamic change of the short DRX cycle and the long DRX cycle is solved.

The implementation processes of the above embodiments of the present disclosure are described below in detail through the several specific examples respectively.

Example 1

Example 1 is described by taking an example that the base station configures one search space set for the power-saving signal, including two monitoring periodicities and one or two monitoring occasion offset values.

According to a flow shown in FIG. 2, a process for configuring the search space set for the power-saving signal may include: the base station configures configuration parameters for the search space set for the power-saving signal through a high-level signaling. The monitoring periodicity for the search space set includes a first monitoring periodicity T1 and a second monitoring periodicity T2, a value of the first monitoring periodicity T1 is an integral multiple of the short DRX cycle, that is, T1=N×the time length of the short DRX cycle, and N is an integer and N≥0; and a value of the second monitoring periodicity T2 is an integral multiple of the long DRX cycle, that is, T2=M×the time length of the long DRX cycle, and M is an integer and M≥1. The search space set includes the one or two monitoring occasion offset values. If there is one monitoring occasion offset value, as for the short DRX cycle and the long DRX cycle, a start position of the monitoring occasion for the power-saving signal is determined according to the offset value; if there are two monitoring occasion offset values offset_1 and offset_2, the offset values of the monitoring occasion corresponding to the short DRX cycle and the long DRX cycle are different, that is, a start position of the monitoring occasion in the short DRX cycle is determined according to the offset value offset_1, and a start position of the monitoring occasion in the long DRX cycle is determined according to the offset value offset_2.

Units of the first monitoring occasion offset offset_1 and the second monitoring occasion offset offset_2 may be slots, taking an example that the slot serves as the unit, the first monitoring occasion offset needs to meet the following relation:

$$\begin{cases} o_{s-DRX} \bmod (k_{s-shortDRX}) - \\ \text{offset\_1} \bmod (k_{s-shortDRX}) = & \text{if offset\_short} \leq o_{s-DRX} \\ \quad \text{offset\_short}, & \bmod (k_{s-shortDRX}), \\ k_{s-shortDRX} + \\ \text{offset\_1} \bmod (k_{s-shortDRX}) - \\ \text{offset\_1} \bmod (k_{s-shortDRX}) = & \text{else} \\ \quad \text{offset\_short}, \end{cases}$$

That is, the time offset is between the power-saving signal and a start time of a first short DRX cycle within the monitoring periodicity.

Where, $O_{s\text{-}DRX}$ is long DRX start offset, $k_{s\text{-}shortDRX}$ is the short DRX cycle, A mod(B) represents mode operation of mode B on an A value, offset_1 is the first monitoring occasion offset, and offset_short is a time offset from the power-saving signal to the short DRX cycle.

The second monitoring occasion offset needs to meet the following relation:

$$\begin{cases} o_{s-DRX} - \\ \text{offset\_2} \bmod (k_{s-longDRX}) = & \text{if offset\_long} \leq o_{s-DRX} \\ \quad \text{offset\_long}, \\ k_{s-longDRX} + o_{s-DRX} - \\ \text{offset\_2} \bmod (k_{s-longDRX}) = & \text{else} \\ \quad \text{offset\_long}, \end{cases}$$

That is, a time offset is between the power-saving signal and a start time of a first long DRX cycle within the monitoring periodicity.

Where, $O_{s\text{-}DRX}$ is long DRX start offset, offset_2 is the second monitoring occasion offset, and offset_long is a time offset from the power-saving signal to the long DRX cycle.

In one embodiment, values of the first monitoring occasion offset offset_1 and the second monitoring occasion offset offset_2 may be the same or different.

In one embodiment, a time offset offset_short from the power-saving signal to the short DRX cycle and a time offset offset_long from the power-saving signal to the long DRX cycle may be configured by the high-level signaling, or may also be implicitly indicated by configuring the monitoring occasion offset without additionally configuring offset_short and offset_long, and only the monitoring occasion offset and a start position of the DRX cycle meets the above relation.

Other parameters are similar to conventional parameter configuration of the search space set for the PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) for the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

For example, if the current terminal is in the short DRX cycle, that is, when a short DRX cycle timer is not time out, the base station sends the power-saving signal at a position corresponding to a monitoring occasion offset value offset_1 in the short DRX cycle needing to be indicated. If the current terminal enters into the long DRX cycle, the base station sends the power-saving signal at a position corresponding to a monitoring occasion offset value offset_2 in the long DRX cycle needing to be indicated. Consistent with a conventional PDCCH sending law, the base station does not necessarily send the power-saving signal for the terminal at all the monitoring occasions.

According to a flow shown in FIG. 3, a process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

When the terminal receives MAC CE carrying a DRX command, DRX is started, at this time, the terminal enters into the short DRX cycle, and the short DRX cycle timer (drx-ShortCycleTimer) is started or restarted. At the moment, the terminal monitors the power-saving signal according to the first monitoring periodicity T1 in relevant parameters of the search space set configured by the base station. For example, T1=2×the time length of the short DRX cycle, and thus the terminal monitors the power-saving signal once at every two short DRX cycles. If there is one monitoring occasion offset value offset_1 in the search space set configured by the base station, a position of a candidate power-saving signal is determined according to the offset_1. If there are two monitoring occasion offset values offset_1 and offset_2 in the search space set configured by the base station, a position of a candidate power-saving signal is determined according to the offset_1.

In the short DRX cycle, the terminal only monitors PDCCH in the active period. Every time when the terminal receives DCI with new data indication, a DRX inactivity timer (drx-InactivityTimer) is started or restarted. When the DRX inactivity timer is time out, the terminal enters into a dormant period, namely, an inactive state, and the terminal starts or restarts a short DRX cycle timer (drx-ShortCycleTimer) at the same time. Before the short DRX cycle timer is time out, the terminal adopts the short DRX cycle, and monitors the power-saving signal based on PDCCH with the monitoring occasion of offset_1 slots before each short DRX cycle with a time length of a cycle being T1.

When the short DRX cycle timer (drx-ShortCycleTimer) is time out or MAC CE carrying a long DRX command sent by the base station is received, the terminal enters into a long DRX cycle. For example, T2=1 along DRX cycle, and thus the terminal monitors the power-saving signal once at each long DRX cycle. If there is one monitoring occasion offset value offset_1 in the search space set for the power-saving signal, a position of a candidate power-saving signal is determined according to the offset_1. If there are two monitoring occasion offset values offset_1 and offset_2 in the search space set for the power-saving signal, a position of a candidate power-saving signal is determined according to the offset_2.

When the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and monitors the power-saving signal with the first monitoring periodicity T1.

When the terminal is in the short DRX cycle and the short DRX cycle timer (drx-ShortCycleTimer) is not time out, if the MAC CE carrying the long DRX command sent by the base station is received, the terminal enters into the long DRX cycle. At this time, the terminal monitors the power-saving signal with T2 as the monitoring periodicity.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; otherwise, the terminal continues to be in an inactive state at the active period of the subsequent DRX cycle. The above monitoring motion of candidate DRX only serves as an example, and the embodiment of the present disclosure is not limited to execution of other processing operations.

Example 2

Example 2 is described by taking an example that the base station configures the two search space sets for the power-saving signal, each search space set corresponds to one DRX cycle and one monitoring occasion offset value.

According to a flow shown in FIG. 2, a configuration process of the search space set for the power-saving signal may include: the base station configures the two search space sets for the power-saving signal through a high-level signaling, which are respectively able to be used for the long DRX cycle and the short DRX cycle. The monitoring occasion cycles of the two search space sets of the power-saving signal are respectively a first monitoring periodicity T1 and a second monitoring periodicity T2, and a value of T1 is an integral multiple of the short DRX cycle, that is, T1=N×the time length of the short DRX cycle, and N is an integer and N≥0; and a value of T2 is an integral multiple of the long DRX cycle, that is, T2=M×the time length of the long DRX cycle, and M is an integer and M≥1. The offset values offset for the monitoring occasions in the two search space sets are respectively marked as offset_1 and offset_2, and the values of offset_1 and offset_2 may be the same or different. Other parameters of the search space set are similar to conventional parameter configuration of the search space set of the PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) for the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

According to a flow shown in FIG. 3, a process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

When the terminal receives MAC CE carrying a DRX command, DRX is started, at the moment, the terminal enters into the short DRX cycle, and a short DRX cycle timer (drx-ShortCycleTimer) is started or restarted. At the moment, the terminal monitors the power-saving signal according to the first monitoring periodicity T1 in relevant parameters of the search space set for the power-saving signal configured by the high-level signaling, for example, T1=2×the time length of the short DRX cycle, and thus the terminal monitors the power-saving signal once at every two short DRX cycles. A candidate power-saving signal is located at a position of offset_1 slots before the active period (on-duration) of the short DRX cycle.

In the short DRX cycle, the terminal only monitors PDCCH in the active period. Every time when the terminal receives DCI with new data indication, a DRX inactivity timer (drx-InactivityTimer) is started or restarted. When the DRX inactivity timer is time out, the terminal enters into a dormant period, namely, an inactive state, and the terminal starts or restarts the short DRX cycle timer (drx-ShortCycleTimer) at the same time. Before the short DRX cycle timer is time out, the terminal adopts the short DRX cycle, and monitors the power-saving signal based on PDCCH with the monitoring occasion of offset_1 slots before each short DRX cycle with a cycle being T1.

When the short DRX cycle timer (drx-ShortCycleTimer) is time out or MAC CE carrying a long DRX command sent by the base station is received, the terminal enters into the long DRX cycle. For example, T2=1×the time length of the long DRX cycle, and thus the terminal monitors the power-saving signal once at each long DRX cycle. Specifically, the terminal starts the monitoring occasion at a position of offset 2 slots before each long DRX cycle. If the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and monitors the power-saving signal with the monitoring periodicity T1.

When the terminal is in the short DRX cycle and the short DRX cycle timer (drx-ShortCycleTimer) is not time out, if the MAC CE carrying the long DRX command sent by the base station is received, the terminal enters into the long DRX cycle. At this time, the terminal monitors the power-saving signal with T2 as the monitoring periodicity.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 3

Example 3 is described by taking an example that the base station configures one search space set for the power-saving signal, including two monitoring periodicities and two monitoring time windows.

According to a flow shown in FIG. 2, a configuration process of the search space set for the power-saving signal may include: the base station configures configuration parameters for the search space set for the power-saving signal through a high-level signaling. There are two monitoring periodicities of the search space set, a first monitoring periodicity T1 and a second monitoring periodicity T2, and a value of T1 is an integral multiple of the short DRX cycle, that is, T1=N×the time length of the short DRX cycle, and N is an integer and N $\geq$ 0; and a value of T2 is an integral multiple of the long DRX cycle, that is, T2=M×the time length of the long DRX cycle, and M is an integer and M $\geq$ 1. The present embodiment takes an example that N=2 and M=1. Meanwhile, the two monitoring time windows are configured in the search space set: a first monitoring time window duration_1 and a second monitoring time window duration 2 respectively corresponding to the short DRX cycle and the long DRX cycle, that is, the monitoring time window of the short DRX cycle is duration_1, and the monitoring time window of the long DRX cycle is duration 2. Values of the two time windows may be the same or different. If the two time windows are the same, it is the same as an implementation process of example 1. The present embodiment is described by taking an example that the two time windows are different, for example, when the terminal is in the short DRX cycle, the power-saving signal carries power-saving information of the two short DRX cycles; and when the terminal is in the long DRX cycle, the power-saving signal carries power-saving information of one long DRX cycle, and the base station may configure a value of duration_1 is three slots, and a value of duration 2 is two slots. Other parameters are similar to conventional parameter configuration of the search space set of a PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) for the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

For example, if the current terminal is in the short DRX cycle, that is, when a short DRX cycle timer (drx-ShortCycleTimer) is not time out, the base station sends the power-saving signal with the monitoring periodicity being T1 at the short DRX cycle needing to be indicated and at a position corresponding to a monitoring offset value offset of the first short DRX cycle, and continuously sends duration_1 slots. If the current terminal enters into the long DRX cycle, the base station sends the power-saving signal at a position corresponding to a monitoring offset value of the long DRX cycle needing to be indicated, and continuously sends duration_2 slots. Consistent with a conventional PDCCH sending law, the base station does not necessarily send the power-saving signal for the terminal at all the monitoring occasions.

According to a flow shown in FIG. 3, a process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

If the terminal receives MAC CE carrying a DRX command, DRX is started, at this time, the terminal enters into the short DRX cycle, and the short DRX cycle timer (drx-ShortCycleTimer) is started or restarted. At the moment, the terminal monitors the power-saving signal according to the first monitoring periodicity T1 in relevant parameters of the search space set for the power-saving signal configured by a high-level signaling. For example, T1=2×the time length of the short DRX cycle, and thus the terminal monitors the power-saving signal once at every two short DRX cycles. Specifically, the terminal monitors the power-saving signal at a position corresponding to the monitoring offset value offset of the first short DRX cycle, and monitoring for the power-saving signal lasts for duration_1 slots.

In the short DRX cycle, the terminal only monitors PDCCH in the active period. Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle, and monitors the power-saving signal with the monitoring periodicity being T1 at a position corresponding to the monitoring offset value offset of the first short DRX cycle, and monitoring for the power-saving signal lasts for duration_1 slots.

When the short DRX cycle timer (drx-ShortCycleTimer) is time out or MAC CE carrying a long DRX command sent by the base station is received, the terminal enters into the long DRX cycle. For example, T2=1×the time length of the long DRX cycle, and thus the terminal monitors the power-saving signal once at each long DRX cycle. Specifically, the terminal monitors the power-saving signal at a position corresponding to the monitoring offset value offset of each long DRX cycle, and monitoring for the power-saving signal lasts for duration_2 slots. If the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and monitors the power-saving signal with the monitoring periodicity T1, the power-saving signal is located at a position corresponding to the monitoring offset value offset of one short DRX cycle of the monitoring periodicity, and monitoring for the power-saving signal lasts for duration_1 slots.

When the terminal is in the short DRX cycle and the short DRX cycle timer (drx-ShortCycleTimer) is not time out, if the MAC CE carrying the long DRX command sent by the base station is received, the terminal enters into the long DRX cycle. At this time, the terminal monitors the power-saving signal with T2 being the monitoring periodicity, that is, the power-saving signal is located at a position corresponding to the monitoring offset value offset of each long DRX cycle, and monitoring for the power-saving signal lasts for duration_2 slots.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 4

Example 4 is described by taking an example that the base station configures one search space set for the power-saving signal, including two monitoring periodicities and two control resource sets.

According to a flow shown in FIG. 2, a configuration process of the search space set for the power-saving signal may include: the base station configures configuration parameters for the search space set for the power-saving signal through a high-level signaling. There are two monitoring periodicities of the search space set, a first monitoring periodicity T1 and a second monitoring periodicity T2, and a value of T1 is an integral multiple of the short DRX cycle, that is, T1=N×the time length of the short DRX cycle, and N is an integer and N $\geq$ 0; and a value of T2 is an integral multiple of the long DRX cycle, that is, T2=M×the time length of the long DRX cycle, and M is an integer and M $\geq$ 1. The present embodiment takes an example that N=2 and M=1.

The two control resource sets associated with the search space set are configured in the search space set: a first control resource set CORESET_1 and a second control resource set CORESET_2, respectively corresponding to the short DRX cycle and the long DRX cycle, that is, the control resource set for the short DRX cycle is the first control resource set CORESET_1, and the control resource set for the long DRX cycle is the second control resource set CORESET_2. The two control resource sets may be the same or different. If the two control resource sets are the same, it is the same as an implementation process of example 1. The present embodiment takes an example that the two control resource sets are different, for example: when the terminal is in the short DRX cycle, the first control resource set CORESET_1 occupies three symbols at a time domain; and when the terminal is in the long DRX cycle, the second control resource set CORESET_2 occupies two symbols at the time domain. In one embodiment, CORESET where the long DRX cycle and the short DRX cycle are located may also be different occupied frequency domain resources. Other parameters are similar to conventional parameter configuration of the search space set of a PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) of the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

For example: if the current terminal is in the short DRX cycle, that is, when a short DRX cycle timer (drx-ShortCycleTimer) is not time out, the base station sends the power-saving signal with the monitoring periodicity being T1 at the short DRX cycle needing to be indicated and at a position corresponding to a monitoring offset value offset of the first short DRX cycle, and the resource set where the power-saving signal is located is the first control resource set CORESET_1. If the current terminal enters into the long DRX cycle, the base station sends the power-saving signal at a position corresponding to a monitoring offset value offset of the long DRX cycle needing to be indicated, and the resource set where the power-saving signal is located is the second control resource set CORESET_2. Consistent with a conventional PDCCH sending law, the base station does not necessarily send the power-saving signal for the terminal at all the monitoring occasions.

According to a flow shown in FIG. 3, a process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

if the terminal receives MAC CE carrying a DRX command, DRX is started, at this time, the terminal enters into the short DRX cycle, and the short DRX cycle timer (drx-ShortCycleTimer) is started or restarted. At the moment, the terminal monitors the power-saving signal according to the first monitoring periodicity T1 in relevant parameters of the search space set for the power-saving signal configured by a high-level signaling. For example, T1=2×the time length of the short DRX cycle, and thus the terminal monitors the power-saving signal once at every two short DRX cycles. Specifically, the terminal monitors the power-saving signal at a position corresponding to the monitoring offset value offset of the first short DRX cycle, and the resource set where the power-saving signal is located is the first control resource set CORESET_1.

In the short DRX cycle, the terminal only monitors PDCCH in the active period. Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle, and monitors the power-saving signal with the monitoring periodicity being T1 at a position corresponding to the monitoring offset value offset of the first short DRX cycle, and the resource set where the power-saving signal is located is the first control resource set CORESET_1.

When the short DRX cycle timer (drx-ShortCycleTimer) is time out or MAC CE carrying a long DRX command sent by the base station is received, the terminal enters into the long DRX cycle. For example, T2=1×the time length of the long DRX cycle, and thus the terminal monitors the power-saving signal once at each long DRX cycle. Specifically, the terminal monitors the power-saving signal at a position corresponding to the monitoring offset value offset of the each long DRX cycle, and the resource set where the power-saving signal is located is the second control resource set CORESET_2. If the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and monitors the power-saving signal with the monitoring periodicity T1, the power-saving signal is located at a position corresponding to the monitoring offset value offset of one short DRX cycle of the monitoring periodicity, and the resource set where the power-saving signal is located is the first control resource set CORESET_1.

When the terminal is in the short DRX cycle and the short DRX cycle timer (drx-ShortCycleTimer) is not time out, and when the MAC CE carrying the long DRX command sent by the base station is received, the terminal enters into the long DRX cycle. At this time, the terminal monitors the power-saving signal with T2 being the monitoring periodicity, that is, the power-saving signal is located at a position corresponding to the monitoring offset value offset of each long DRX cycle, and the resource set where the power-saving signal is located is the second control resource set CORESET_2.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 5

Example 5 is described by taking an example that the base station configures one search space set for the power-saving signal, including two monitoring periodicities and two monitoring patterns.

According to a flow shown in FIG. 2, a configuration process of the search space set for the power-saving signal may include: the base station configures configuration parameters for the search space set for the power-saving signal for the power-saving signal through a high-level signaling. There are two monitoring periodicities of the search space set, a first monitoring periodicity T1 and a second monitoring periodicity T2. A value of T1 is an integral multiple of the short DRX cycle, that is, T1=N×the time length of the short DRX cycle, and N is an integer and $N \geq 0$; and a value of T2 is an integral multiple of the long DRX cycle, that is, T2=M×the time length of the long DRX cycle, and M is an integer and $M \geq 1$. The present embodiment takes an example that N=2 and M=1.

The two monitoring patterns are configured in the search space set: a first monitoring pattern pattern_1 and a second monitoring pattern pattern_2 respectively corresponding to the short DRX cycle and the long DRX cycle, that is, the monitoring pattern for the short DRX cycle is the first monitoring pattern pattern_1, and the monitoring pattern for the long DRX cycle is the second monitoring pattern pattern_2. The two monitoring patterns may be the same or different. When the two monitoring patterns are the same, it is the same as an implementation process of example 1, and the present embodiment takes an example that the two monitoring patterns are different. For example, the monitoring pattern corresponding to the power-saving signal in the short DRX cycle is the first monitoring pattern pattern_1, a time domain resource described by the pattern is: a start symbol is a first symbol, CORESET occupies the three symbols, thus the terminal is in the short DRX cycle, and a symbol occupied by the power-saving signal within one slot is {1, 2, 3}. The monitoring pattern corresponding to the power-saving signal in the long DRX cycle is the second monitoring pattern pattern_2, a time domain resource described by the pattern is: a start symbol is a fourth symbol, CORESET occupies the three symbols, thus the terminal is in the long DRX cycle, and a symbol occupied by the power-saving signal within one slot is {4, 5, 6}. Other parameters are similar to conventional parameter configuration of the search space set of a PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) of the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

For example, if the current terminal is in the short DRX cycle, that is, when a short DRX cycle timer (drx-ShortCycleTimer) is not time out, the base station sends the power-saving signal with the monitoring periodicity being T1 at the short DRX cycle needing to be indicated and at a position corresponding to a monitoring offset value offset of the first short DRX cycle, and the monitoring pattern is the first monitoring pattern pattern_1. If the current terminal enters into the long DRX cycle, the base station sends the power-saving signal at a position corresponding to the monitoring offset value offset of the long DRX cycle needing to be indicated, and the monitoring pattern is the second monitoring pattern pattern_2. Consistent with a conventional PDCCH sending law, the base station does not necessarily send the power-saving signal for the terminal at all the monitoring occasions.

According to a flow shown in FIG. 3, a process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

If the terminal receives MAC CE carrying a DRX command, DRX is started, at this time, the terminal enters into the short DRX cycle, and the short DRX cycle timer (drx-ShortCycleTimer) is started or restarted. At the moment, the terminal monitors the power-saving signal according to the first monitoring periodicity T1 in relevant parameters of the search space set for the power-saving signal configured by the high-level signaling, for example, T1=2×the time length of the short DRX cycle, and thus the terminal monitors the power-saving signal once at every two short DRX cycles. Specifically, the terminal monitors the power-saving signal at a position corresponding to the monitoring offset value offset of the first short DRX cycle, and the monitoring pattern for the power-saving signal is the first monitoring pattern pattern_1.

In the short DRX cycle, the terminal only monitors PDCCH in the active period. Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle, and monitors the power-saving signal with the monitoring periodicity being T1 at a position corresponding to the monitoring offset value offset of the first short DRX cycle, and the monitoring pattern for the power-saving signal is the first monitoring pattern pattern_1.

When the short DRX cycle timer (drx-ShortCycleTimer) is time out or MAC CE carrying a long DRX command sent by the base station is received, the terminal enters into the long DRX cycle. For example, T2=1×long DRX cycle, and thus the terminal monitors the power-saving signal once for each long DRX cycle. Specifically, the terminal monitors the power-saving signal at a position corresponding to the monitoring offset value offset of each long DRX cycle, and the monitoring pattern for the power-saving signal is the second monitoring pattern pattern_2. If the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and monitors the power-saving signal with the monitoring periodicity T1, the power-saving signal is located at a position corresponding to the monitoring offset value offset of one short DRX cycle of the monitoring periodicity, and the monitoring pattern for the power-saving signal is the first monitoring pattern pattern_1.

When the terminal is in the short DRX cycle and the short DRX cycle timer (drx-ShortCycleTimer) is not time out, and when the MAC CE carrying the long DRX command sent by the base station is received, the terminal enters into the long DRX cycle. At this time, the terminal monitors the power-saving signal with T2 being the monitoring periodicity, that is, the power-saving signal is located at a position corresponding to the monitoring offset value offset of each long DRX cycle, and the monitoring pattern for the power-saving signal is the second monitoring pattern pattern_2.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 6

Example 6 is described by taking an example that the base station configures one search space set for the power-saving signal, including one or two monitoring periodicities, and a time offset from the power-saving signal to the DRX cycle is implicitly indicated through monitoring occasion offset.

A configuration process of the search space set for the power-saving signal may include: the base station configures configuration parameters for the search space set for the power-saving signal through a high-level signaling. The monitoring periodicities of the search space set may include a first monitoring periodicity T1 and a second monitoring periodicity T2, and may also only include the second monitoring periodicity T2. A value of the first monitoring periodicity T1 is an integral multiple of the short DRX cycle, that is, T1=N×the time length of the short DRX cycle, and N is an integer and $N \geq 0$; and a value of the second monitoring periodicity T2 is an integral multiple of the long DRX cycle, that is, T2=M×the time length of the long DRX cycle, and M is an integer and $M \geq 1$.

The search space set includes one or two monitoring occasion offset values. If there is one monitoring occasion offset value, as for the short DRX cycle and the long DRX cycle, a start position of the monitoring occasion for the power-saving signal is determined according to the offset value; and if there are two monitoring occasion offset values offset_1 and offset_2, the offset values of the monitoring occasion corresponding to the short DRX cycle and the long DRX cycle are different, that is, a start position of the monitoring occasion of the short DRX cycle is determined according to the offset value offset_1, and a start position of the monitoring occasion of the long DRX cycle is determined according to the offset value offset_2.

Units of the first monitoring occasion offset offset_1 and the second monitoring occasion offset offset_2 may be slots, taking an example that the slot serves as the unit, the first monitoring occasion offset and a start point of the first DRX cycle in the monitoring periodicity needs to meet the following relation:

$$\begin{cases} o_{s-DRX} \bmod (k_{s-shortDRX}) - \\ \text{offset\_1} \bmod (k_{s-shortDRX}) = & \text{if offset\_short} \leq o_{s-DRX} \\ \text{offset\_short}, & \bmod (k_{s-shortDRX}), \\ k_{s-shortDRX} + \\ \text{offset\_1} \bmod (k_{s-shortDRX}) - \\ \text{offset\_1} \bmod (k_{s-shortDRX}) = & \text{else} \\ \text{offset\_short}, \end{cases}$$

That is, the time offset is between the power-saving signal and a start time of a first short DRX cycle within the monitoring periodicity.

Where, $O_{s\text{-}DRX}$ is long DRX start offset, $k_{s\text{-}shortDRX}$ is the short DRX cycle, A mod(B) represents mode operation of mode B on an A value, offset_1 is the first monitoring occasion offset, and offset_short is a time offset from the power-saving signal to the short DRX cycle.

The second monitoring occasion offset and a start point of the adjacent long DRX cycle needs to meet the following relation:

$$\begin{cases} o_{s-DRX} - \\ \text{offset\_2} \bmod (k_{s-longDRX}) = & \text{if offset\_long} \leq o_{s-DRX} \\ \text{offset\_long}, \\ k_{s-longDRX} + o_{s-DRX} - \\ \text{offset\_2} \bmod (k_{s-longDRX}) = & \text{else} \\ \text{offset\_long}, \end{cases}$$

That is, the time offset is between the power-saving signal and a start time of a first long DRX cycle within the monitoring cycle.

where, $O_{s\text{-}DRX}$ is long DRX start offset, offset_2 is the second monitoring occasion offset, and offset_long is a time offset from the power-saving signal to the long DRX cycle.

Values of the first monitoring occasion offset offset_1 and the second monitoring occasion offset offset_2 may be the same or different.

A time offset offset_short from the power-saving signal to the short DRX cycle and a time offset offset_long from the power-saving signal to the long DRX cycle may be parameters related to user capability, and are implicitly indicated here by configuring the monitoring occasion offset without additionally configuring offset_short and offset_long, and only the monitoring occasion offset and a start position of the DRX cycle meets the above relation.

Other parameters are similar to conventional parameter configuration of the search space set of a PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) of the power-saving signal according to the DRX cycle where the terminal is currently located and search space set configuration parameters for the power-saving signal, and sends the power-saving signal at the monitoring occasion of the power-saving signal, to indicate whether the terminal is waked from a dormant state at the subsequent DRX cycle or continues to be dormant.

For example, as for the condition that the first monitoring periodicity T1 and the second monitoring periodicity T2 are configured in the search space set, a process that the terminal monitors the power-saving signal is the same as embodiment 1. As for the condition that only the second monitoring periodicity T2 is configured in the search space set, the base station only sends the power-saving signal at a position corresponding to the monitoring occasion offset value offset_2 before every M (M is an integer and M $\geq$ 1) long DRX cycle.

A process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

As for the condition that the first monitoring periodicity T1 and the second monitoring periodicity T2 are configured in the search space set, a process that the terminal monitors the power-saving signal is the same as embodiment 1.

As for the condition that only the second monitoring periodicity T2 is configured in the search space set, the terminal only monitors a candidate power-saving signal at a position corresponding to the monitoring occasion offset value offset_2 before every M (M is an integer and M$\geq$1) long DRX cycle.

When the terminal receives MAC CE carrying a DRX command, DRX is started, at this time, the terminal enters into the short DRX cycle, and a short DRX cycle timer (drx-ShortCycleTimer) is started or restarted. At the moment, because there is only the second monitoring periodicity T2 in relevant parameters of the search space set configured by the base station, according to configuration, the terminal does not monitor the power-saving signal when being in the short DRX cycle, and monitors PDCCH within the active period of each short DRX cycle.

Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle, and does not monitor the power-saving signal.

When the short DRX cycle timer (drx-ShortCycleTimer) is time out or MAC CE carrying a long DRX command sent by the base station is received, the terminal enters into the long DRX cycle. For example, T2=1×long DRX cycle, and thus the terminal monitors the power-saving signal once at each long DRX cycle. A position of the candidate power-saving signal is determined according to offset_2.

When the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle, and the terminal does not monitor the power-saving signal any more.

When the terminal is in the short DRX cycle and the short DRX cycle timer (drx-ShortCycleTimer) is not time out, if the MAC CE carrying the long DRX command sent by the base station is received, the terminal enters into the long DRX cycle. At this time, the terminal monitors the power-saving signal with T2 as the monitoring periodicity, and the position of the candidate power-saving signal is determined according to offset_2.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; and otherwise, the terminal continues to be in an inactive state at the active period of the subsequent DRX cycle. The above monitoring motion of candidate DRX only serves as an example, and the embodiment of the present disclosure is not limited to execution of other processing operations.

Example 7

Example 7 is described by taking an example that the base station configures one search space set for the power-saving signal, including one or two monitoring periodicities, and a time offset from the power-saving signal to the DRX cycle is explicitly indicated through a high-level signaling.

A configuration process of the search space set for the power-saving signal may include: the base station configures configuration parameters for the search space set for the power-saving signal through the high-level signaling. The monitoring periodicities of the search space set may include a first monitoring periodicity T1 and a second monitoring periodicity T2, and may also only include the second monitoring periodicity T2. A value of the first monitoring periodicity T1 is an integral multiple of the short DRX cycle, that is, T1=N×the time length of the short DRX cycle, and N is an integer and N≥0; and a value of the second monitoring periodicity T2 is an integral multiple of the long DRX cycle, that is, T2=M×the time length of the long DRX cycle, and M is an integer and M≥1.

A monitoring position for the power-saving signal within each monitoring periodicity is indicated by the base station through the time offset from the power-saving signal to the DRX cycle. The base station needs to configure one or two time offsets from the power-saving signal to the DRX cycle for the terminal.

1. Configuring of one monitoring time offset offset_gap means that whether the long DRX cycle or the short DRX cycle, positions that the power-saving signal is located before an active period of the DRX cycle are the same.

2. Two monitoring time offsets offset_long and offset_short are configured, and respectively correspond a time offset from the power-saving signal to the long DRX cycle and a time offset from the power-saving signal to the short DRX cycle. Values of the two time offsets may be the same or different.

Here, the time offset from the power-saving signal to the DRX cycle may be one information field additionally added in search space set configuration information for the power-saving signal, or may be parameter configuration exclusive for the power-saving signal in the high-level signaling from the base station.

Other parameters are similar to conventional parameter configuration of the search space set of a PDCCH, which is not repeated here.

A process that the base station sends the power-saving signal according to a configuration condition of the search space set for the power-saving signal and a transmitting condition of terminal data may include: the base station learns a DRX cycle (that is, the terminal is in the long DRX cycle or the short DRX cycle) where the terminal is located according to DRX configuration information and a data reaching condition at the terminal, determines a monitoring occasion (for example, a monitoring start position of the power-saving signal and a slot length for continuously monitoring the power-saving signal) of the power-saving signal according to the DRX cycle where the terminal is currently located and search space set configuration parameters for the power-saving signal, and sends the power-saving signal at the monitoring occasion for the power-saving signal, to indicate whether the terminal is waked from a dormant state at the subsequent DRX cycle or continues to be dormant.

A process that the terminal receives the power-saving signal may include: the terminal monitors the power-saving signal according to the monitoring occasion for the power-saving signal configured by the high-level signaling. Specifically, under the condition that the terminal is configured with the long DRX cycle and the short DRX cycle at the same time, processing at a terminal side may include the following.

As for the condition that the first monitoring periodicity T1 and the second monitoring periodicity T2 are configured in the search space set, the terminal monitors the power-saving signal in the short DRX cycle and the long DRX cycle respectively according to the monitoring periodicity for the power-saving signal configured by the base station, and a monitoring process is the same as the embodiment 1. Particularly, the terminal needs to calculate the monitoring occasion offset $O_1$ and $O_2$ of the power-saving signal according to the time offset from the power-saving signal to the DRX cycle. The time offset from the power-saving signal to the DRX cycle and start offsets of the short DRX cycle and the long DRX cycle need to meet a relation:

$$\begin{cases} o_{s-DRX} \bmod (k_{s-shortDRX}) - \\ \quad o_1 \bmod (k_{s-shortDRX}) = \\ \quad \textit{offset}_{short}, \\ k_{s-shortDRX} + \\ \quad o_{s-DRX} \bmod (k_{s-shortDRX}) - \\ \quad o_1 \bmod (k_{s-shortDRX}) = \\ \quad \textit{offset}_{short}, \end{cases} \begin{array}{l} \text{if } \textit{offset}_{short} \leq \\ o_{s-DRX} \bmod (k_{s-shortDRX}), \\ \\ \text{else} \end{array}$$

$$\begin{cases} o_{s-DRX} - o_2 \bmod (k_{s-longDRX}) = \\ \quad \textit{offset}_{long}, \\ k_{s-longDRX} + o_{s-DRX} - \\ \quad o_2 \bmod (k_{s-longDRX}) = \\ \quad \textit{offset}_{long}, \end{cases} \begin{array}{l} \text{if } \textit{offset}_{long} \leq o_{s-DRX} \\ \\ \text{else} \end{array},$$

which is represented as that a time offset needs to exist from a monitoring position for the power-saving signal to a first DRX start time within the monitoring periodicity for the power-saving signal, and the time offset is the time offsets offset$_{long}$ and offset$_{short}$ from the power-saving signal to the DRX cycle and configured by the base station.

where, $O_{s-DRX}$ is long DRX start offset, $k_{s-shortDRX}$ is the short DRX cycle, $k_{s-longDRX}$ is the long DRX cycle, A mod(B) represents mode operation of mode B on an A value, $O_1$ is power-saving signal monitoring occasion offset corresponding to the short DRX cycle, and $O_2$ is power-saving signal monitoring occasion offset corresponding to the long DRX cycle.

If the base station is only configured with one time offset, the power-saving signal only meets the following relation at the long DRX cycle and the short DRX cycle:

$$\begin{cases} o_{s-DRX} \bmod (k_{s-shortDRX}) - \\ o_1 \bmod (k_{s-shortDRX}) = & \text{if offset}_{gap} \leq \\ \quad \textit{offset}_{gap}, & o_{s-DRX} \bmod (k_{s-shortDRX}), \\ k_{s-shortDRX} + \\ o_{s-DRX} \bmod (k_{s-shortDRX}) - \\ o_1 \bmod (k_{s-shortDRX}) & \text{else} \\ \quad \textit{offset}_{gap}, \end{cases}$$

$$\begin{cases} o_{s-DRX} - o_2 \bmod (k_{s-longDRX}) = \\ \quad \textit{offset}_{gap}, & \text{if offset}_{gap} \leq o_{s-DRX} \\ k_{s-longDRX} + o_{s-DRX} - \\ o_2 \bmod (k_{s-longDRX}) = & \text{else} \\ \quad \textit{offset}_{gap}, \end{cases}$$

As for the condition that only the second monitoring periodicity T2 is configured in the search space set, the base station only sends the power-saving signal at a position corresponding to the monitoring occasion offset value $O_2$ before every M (M is an integer and M ≥ 1) long DRX cycle. The monitoring occasion offset value $O_2$ needs to meet the following relation, that is, a time offset from the power-saving signal to a start time of a first long DRX cycle within the monitoring periodicity for the power-saving signal meets the following relation:

$$\begin{cases} o_{s-DRX} - o_2 \bmod (k_{s-longDRX}) = \\ \quad \textit{offset}_{gap}, & \text{if offset}_{gap} \leq o_{s-DRX}, \\ k_{s-longDRX} + o_{s-DRX} - \\ o_2 \bmod (k_{s-longDRX}) = & \text{else} \\ \quad \textit{offset}_{gap}, \end{cases}$$

Where, $O_{s-DRX}$ is long DRX start offset, $k_{s-longDRX}$ is the long DRX cycle, A mod(B) represents mode operation of mode B on an A value, $O_s$ is power-saving signal monitoring occasion offset corresponding to the long DRX cycle, and offset_gap is a time offset from the power-saving signal to the long DRX cycle.

When the terminal receives MAC CE carrying a DRX command, DRX is started, at this time, the terminal enters into the short DRX cycle, and a short DRX cycle timer (drx-ShortCycleTimer) is started or restarted. At the moment, if the base station is configured with the first monitoring periodicity T1, the terminal monitors a candidate power-saving signal according to relevant parameters of the search space set configured by the base station. For example, T1=2×the time length of the short DRX cycle, and thus the terminal monitors the power-saving signal once at every two short DRX cycles. If the base station is configured with one monitoring time offset offset_gap, the terminal calculates a position of the candidate power-saving signal according to the time offset offset_gap. If the base station is configured with the two monitoring time offsets offset_long and offset_short, the terminal calculates a position of the candidate power-saving signal according to the monitoring time offset offset_short. If the base station is not configured with the first monitoring periodicity T1 for the short DRX cycle, the terminal does not monitor the power-saving signal within the short DRX cycle.

In the short DRX cycle, the terminal only monitors PDCCH in the active period. Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle. If the base station configures the first monitoring periodicity T1, the terminal calculates the position of the candidate power-saving signal with a length of a monitoring periodicity being T1 according to the time offset offset_gap configured by the base station, and monitors the power-saving signal. If the base station is configured with the two monitoring time offsets offset_long and offset_short, the terminal calculates the position of the candidate power-saving signal according to the monitoring time offset offset_short. If the base station is not configured with the first monitoring periodicity T1 for the short DRX cycle, the terminal does not monitor the power-saving signal within the short DRX cycle.

When the short DRX cycle timer (drx-ShortCycleTimer) is time out or MAC CE carrying a long DRX command sent by the base station is received, the terminal enters into the long DRX cycle. For example, T2=1×long DRX cycle, and thus the terminal monitors the power-saving signal once at each long DRX cycle. If the base station is configured with one monitoring time offset offset_gap, the terminal calculates the position of the candidate power-saving signal according to the time offset offset_gap. If the base station is configured with the two monitoring time offsets offset_long and offset_short, the terminal calculates and determines the position of the candidate power-saving signal according to the monitoring time offset offset_long.

When the terminal receives DCI with new data indication within the active period of the long DRX cycle, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal is in the short DRX cycle. If the base station is configured with the first monitoring periodicity T1, the terminal calculates the position of the candidate power-saving signal with the length of the monitoring periodicity being T1 according to the time offset offset_gap configured by the base station, and monitors the power-saving signal. If the base station is configured with the two monitoring time offsets offset_long and offset_short, the terminal calculates the position of the candidate power-saving signal according to the monitoring time offset offset_short. If the base station is not configured with the first monitoring periodicity T1 for the short DRX cycle, the terminal does not monitor the power-saving signal within the short DRX cycle.

When the terminal is in the short DRX cycle and the short DRX cycle timer (drx-ShortCycleTimer) is not time out, if the MAC CE carrying the long DRX command sent by the base station is received, the terminal enters into the long DRX cycle. For example, T2=1×long DRX cycle, and thus the terminal monitors the power-saving signal once at each long DRX cycle. If the base station is configured with one monitoring time offset offset_gap, the terminal calculates the position of the candidate power-saving signal according to the time offset offset_gap. If the base station is configured with the two monitoring time offsets offset_long and offset_short, the terminal calculates and determines the position of the candidate power-saving signal according to the monitoring time offset offset_long.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 8

Example 8 is described by taking an example that the power-saving signal is only transmitted in one CORESET, the base station does not configure the search space set for the power-saving signal, but a time offset from the power-saving signal to the DRX cycle is explicitly indicated through a high-level signaling.

When the power-saving signal is associated with the DRX cycle, that is, the power-saving signal performs receiving before each DRX active period or performs receiving only before each long DRX cycle, thus the base may not configure the monitoring periodicity for the power-saving signal for the terminal, and implicit indication is performed by the DRX cycle. Under this condition, the base station only needs to configure a time offset from the power-saving signal to the DRX cycle for indicating a monitoring position for the power-saving signal. There may be specifically following several conditions.

1. If the power-saving signal needs to be received before the active period of each DRX cycle, including the short DRX cycle and the long DRX cycle, the base station needs to configure one or two time offsets from the power-saving signal to the DRX cycle for the terminal as below.

A) Configuring of one monitoring time offset offset_gap means that whether the long DRX cycle or the short DRX cycle, positions that the power-saving signal is located before the active period of the DRX cycle are the same.

B) Two monitoring time offsets offset_long and offset_short are configured, and respectively correspond a time offset from the power-saving signal to the long DRX cycle and a time offset from the power-saving signal to the short DRX cycle.

2. If the power-saving signal only needs to be received before the active period of each DRX cycle, the base station only needs to configure one time offset offset_long from the power-saving signal to the DRX cycle for the terminal.

Here, the time offset from the power-saving signal to the DRX cycle may be one information field additionally added in search space set configuration information for the power-saving signal, or may be parameter configuration exclusive for the power-saving signal in the high-level signaling from the base station.

As for the above condition 1, a process that the terminal receives the power-saving signal may include the following.

The terminal needs to calculate the monitoring occasion offset according to the time offset from the power-saving signal to the DRX cycle.

1. If the base station is configured with the two time offsets offset_long and offset_short, the time offset from the power-saving signal to the DRX cycle and start offsets of the short DRX cycle and the long DRX cycle need to meet the following relation:

$$\begin{cases} o_{s-DRX} \bmod (k_{s-shortDRX}) - \\ \quad o_1 \bmod (k_{s-shortDRX}) = & \text{if offset}_{short} \leq \\ \quad \textit{offset}_{short}, & o_{s-DRX} \bmod (k_{s-shortDRX}), \\ k_{s-shortDRX} + \\ o_{s-DRX} \bmod (k_{s-shortDRX}) - \\ \quad o_1 \bmod (k_{s-shortDRX}) = & \text{else} \\ \quad \textit{offset}_{short}, \end{cases}$$

$$\begin{cases} o_{s-DRX} - o_2 \bmod (k_{s-longDRX}) = \\ \quad \textit{offset}_{long}, & \text{if offset}_{long} \leq o_{s-DRX} \\ k_{s-longDRX} + o_{s-DRX} - \\ \quad o_2 \bmod (k_{s-longDRX}) = & \text{else} \\ \quad \textit{offset}_{long}, \end{cases}$$

which is represented as that a time offset needs to exist from a monitoring position for the power-saving signal to a first DRX start time within the monitoring periodicity for the power-saving signal, and the time offset is the time offsets offset$_{long}$ and offset$_{short}$ from the power-saving signal to the DRX cycle and configured by the base station.

Where, $O_{s-DRX}$ is long DRX start offset, $k_{s-shortDRX}$ is the short DRX cycle, $k_{s-longDRX}$ is the long DRX cycle, A mod(B) represents mode operation of mode B on an A value, $O_1$ is power-saving signal monitoring occasion offset corresponding to the long DRX cycle, and $O_2$ is power-saving signal monitoring occasion offset corresponding to the short DRX cycle.

2. If the base station is only configured with one time offset, the power-saving signal only meets the following relation at the long DRX cycle and the short DRX cycle:

$$\begin{cases} o_{s-DRX} \bmod (k_{s-shortDRX}) - \\ \quad o_1 \bmod (k_{s-shortDRX}) = & \text{if offset}_{gap} \leq \\ \quad \textit{offset}_{gap}, & o_{s-DRX} \bmod (k_{s-shortDRX}), \\ k_{s-shortDRX} + \\ o_{s-DRX} \bmod (k_{s-shortDRX}) - \\ \quad o_1 \bmod (k_{s-shortDRX}) = & \text{else} \\ \quad \textit{offset}_{gap}, \end{cases}$$

$$\begin{cases} o_{s-DRX} - o_2 \bmod (k_{s-longDRX}) = \\ \quad \textit{offset}_{gap}, & \text{if offset}_{gap} \leq o_{s-DRX} \\ k_{s-longDRX} + o_{s-DRX} - \\ \quad o_2 \bmod (k_{s-longDRX}) = & \text{else} \\ \quad \textit{offset}_{gap}, \end{cases}$$

As for the condition that only the second monitoring periodicity T2 is configured in the search space set, the base station only sends the power-saving signal at a position corresponding to the monitoring occasion offset value $O_1$ before every M (M is an integer and M≥1) long DRX cycle, and the monitoring occasion offset value $O_1$ needs to meet the following relation, that is, a time offset from the power-saving signal to a first DRX cycle start time within the monitoring periodicity for the power-saving signal meets the following relation:

$$\begin{cases} o_{s-DRX} - o_2 \bmod (k_{s-longDRX}) = \\ \quad \text{offset}_{gap}, & \text{if offset}_{gap} \le o_{s-DRX}, \\ k_{s-longDRX} + o_{s-DRX} - \\ \quad o_2 \bmod (k_{s-longDRX}) = \\ \quad \text{offset}_{gap}, & \text{else} \end{cases}$$

Where, $O_{s-DRX}$ is long DRX start offset, $k_{s-longDRX}$ is the long DRX cycle, A mod(B) represents mode operation of mode B on an A value, $O_s$ is power-saving signal monitoring occasion offset corresponding to the long DRX cycle, and offset_gap is a time offset from the power-saving signal to the DRX cycle.

3. If only the second monitoring periodicity T2 is configured in the search space set, the terminal only calculates corresponding to the monitoring occasion offset value before the long DRX cycle every M (M is an integer and M ≥ 1) long DRX cycles according to configuration parameters of the base station, specifically as follows:

$$\begin{cases} o_{s-DRX} - o_2 \bmod (k_{s-longDRX}) = \\ \quad \text{offset}_{gap}, & \text{if offset}_{gap} \le o_{s-DRX}, \\ k_{s-longDRX} + o_{s-DRX} - \\ \quad o_2 \bmod (k_{s-longDRX}) = \\ \quad \text{offset}_{gap}, & \text{else} \end{cases}$$

Where, $O_{s-DRX}$ is long DRX start offset, $k_{s-longDRX}$ is the long DRX cycle, A mod(B) represents mode operation of mode B on an A value, $O_s$ is power-saving signal monitoring occasion offset corresponding to the long DRX cycle, and offset_gap is a time offset from the power-saving signal to the long DRX cycle.

When the terminal receives MAC CE carrying a DRX command, DRX is started, at this time, the terminal enters into the short DRX cycle, and a short DRX cycle timer (drx-ShortCycleTimer) is started or restarted. At the moment, the terminal monitors the power-saving signal before each short DRX cycle. If the base station is configured with one monitoring time offset offset_gap, the terminal monitors the candidate power-saving signal before the active period of the short DRX cycle according to power-saving signal monitoring offset obtained by offset_gap calculation. If the base station is configured with the two monitoring time offsets, the terminal monitors the candidate power-saving signal before the active period of the short DRX cycle according to power-saving signal monitoring offset obtained by offset_short calculation.

In the short DRX cycle, the terminal only monitors PDCCH in the active period. Every time when the terminal receives DCI with new data indication, a DRX inactivity timer (drx-InactivityTimer) is started or restarted. When the timer is time out, the terminal enters into a dormant period, namely, an inactive state, and the terminal starts or restarts the short DRX cycle timer (drx-ShortCycleTimer) at the same time. Before the timer is time out, the terminal adopts the short DRX cycle. The terminal monitors the power-saving signal before each short DRX cycle. If the base station is configured with one monitoring time offset offset_gap, the terminal monitors the candidate power-saving signal before the active period of the short DRX cycle according to power-saving signal monitoring offset obtained by offset_gap calculation. If the base station is configured with the two monitoring time offsets, the terminal monitors the candidate power-saving signal before the active period of the short DRX cycle according to power-saving signal monitoring offset obtained by offset_short calculation.

When the short DRX cycle timer (drx-ShortCycleTimer) is time out or MAC CE carrying a long DRX command sent by the base station is received, the terminal enters into the long DRX cycle. The terminal monitors the power-saving signal before each long DRX cycle. If the base station is configured with one monitoring time offset offset_gap, the terminal monitors the candidate power-saving signal before the active period of the long DRX cycle according to power-saving signal monitoring offset obtained by offset_gap calculation. If the base station is configured with the two monitoring time offsets, the terminal monitors the candidate power-saving signal before the active period of the long DRX cycle according to power-saving signal monitoring offset obtained by offset_long calculation.

When the terminal receives DCI with new data indication within the active period of the long DRX cycle, a DRX inactivity timer (drx-InactivityTimer) is started or restarted. When the timer is time out, the terminal enters into the dormant period, namely, the inactive state, and the terminal starts or restarts the short DRX cycle timer (drx-ShortCycleTimer) at the same time. Before the timer is time out, the terminal is in the short DRX cycle. The terminal monitors the power-saving signal before each short DRX cycle. If the base station is configured with one monitoring time offset offset_gap, the terminal monitors the candidate power-saving signal before the active period of the short DRX cycle according to power-saving signal monitoring offset obtained by offset_gap calculation. If the base station is configured with the two monitoring time offsets, the terminal monitors the candidate power-saving signal before the active period of the short DRX cycle according to power-saving signal monitoring offset obtained by offset_short calculation.

When the terminal is in the short DRX cycle and the short DRX cycle timer (drx-ShortCycleTimer) is not time out, if the MAC CE carrying the long DRX command sent by the base station is received, the terminal enters into the long DRX cycle. At this time, the terminal monitors the power-saving signal before each long DRX cycle. If the base station is configured with one monitoring time offset offset_gap, the terminal monitors the candidate power-saving signal before the active period of the long DRX cycle according to power-saving signal monitoring offset obtained by offset_gap calculation. If the base station is configured with the two monitoring time offsets, the terminal monitors the candidate power-saving signal before the active period of the long DRX cycle according to power-saving signal monitoring offset obtained by offset_long calculation.

Further, the terminal monitors the power-saving signal at the monitoring occasion for the power-saving signal before the active period (on-duration) of the DRX cycle, and performs subsequent DRX monitoring motion according to the condition of the monitored power-saving signal. For example, if the terminal receives the power-saving signal at the monitoring occasion for the power-saving signal, the terminal enters into an active state at the active period of the subsequent DRX cycle and monitors PDCCH; and otherwise, the terminal continues to be in the inactive state at the active period of the subsequent DRX cycle. The above monitoring motion of candidate DRX only serves as an example, and the embodiment of the present disclosure is not limited to execution of other processing operations.

Example 9

Example 9 describes a configuration mode of the base station for the power-saving signal under a scene that the power-saving signal is transmitted within CORESETs, and monitoring an offset for the power-saving signal is configured through a time offset from the DRX cycle.

In some conditions, such as under an FR2 (frequency range 2) scene, transceiving beams change quickly, the terminal needs to perform beam scanning on beams where the power-saving signal is located to determine an available sending beam or receiving beam. Under this condition, the power-saving signal is sent on beams, the different beams may be indicated by the CORESET where the power-saving signal is located, or may also be indicated through an associated SSB (SS and PBCH block) or CSI-RS (Channel State Information—Reference Signal). The present embodiment takes an example that beam information is indicated through the CORESET associated with the search space set. As for this condition, the base station configures search space sets for the terminal, each search space set is associated with one control resource set CORESET, these search space sets may be subjected to time division multiplexing, the beam information carried by the CORESETs associated with the different search space sets may be the same or different. Taking an R15 standard as an example, three CORESETs are at most configured on each BWP (Bandwidth Part). For example, it is assumed that the base station configures the three search space sets for the terminal to monitor the power-saving signal, each search space set is associated with one CORESET, and indicates one beam. A monitoring position where the power-saving signal is located may be adjacent $3*k(k\geq1)$ slots. In the present embodiment, the monitoring position for the power-saving signal is configured through a time offset between the power-saving signal and the DRX cycle, that is, the different time offsets from the DRX cycle are configured for the different power-saving signals.

1. If the base station is only configured with one time offset for each search space set (or control resource set), which is available for both the long DRX cycle and the short DRX cycle, the time offsets corresponding to the different search space sets (or control resource sets) are respectively offset_gap1, offset_gap2, offset_gap3.

2. If the base station is only configured with the two time offsets for each search space set (or control resource set), which respectively correspond to the long DRX cycle and the short DRX cycle, the base station needs to additionally configure the following time offsets: offset_long1, offset_short1, offset_long2, offset_short2, offset_long3 and offset_short3 which respectively correspond to the different search space sets (or control resource sets).

Here, the time offset from the power-saving signal to the DRX cycle may be one information field additionally added in search space set configuration information for the power-saving signal, or may be parameter configuration of an exclusive information field of the power-saving signal in the high-level signaling from the base station.

The terminal needs to calculate the monitoring occasion offset according to the time offset from the power-saving signal to the DRX cycle, and the specific calculation process is the same as example 8, which is not repeated here.

A subsequent process that the terminal monitors the power-saving signal is also the same as example 8, which is not repeated here.

Example 10

Example 10 describes a configuration mode of the base station for the power-saving signal under a scene that the power-saving signal is transmitted within CORESETs, and monitoring offset for the power-saving signal is configured through monitoring offset in the search space set.

In some conditions, such as under an FR2 scene, transceiving beams change quickly, the terminal needs to perform beam scanning on beams where the power-saving signal is located to determine an available sending beam or receiving beam. Under this condition, the power-saving signal is sent on beams, the different beams may be indicated by the CORESET where the power-saving signal is located, or may also be indicated through an associated SSB or CSI-RS. The present embodiment takes an example that beam information is indicated through the CORESET associated with the search space set. As for this condition, the base station configures search space sets for the terminal, each search space set is associated with one control resource set CORESET, these search space sets may be subjected to time division multiplexing, the beam information carried by the CORESETs associated with the different search space sets may be the same or different. Taking an R15 standard as an example, three CORESETs are at most configured on each BWP. The base station may configure the three search space sets for the terminal to monitor the power-saving signal, each search space set is associated with one CORESET, and indicates one beam. A monitoring position where the power-saving signal is located may be adjacent $3*k(k\geq1)$ slots. In the present embodiment, the monitoring position for the power-saving signal is configured through the monitoring offset in the search space set, that is, the different monitoring offset values are configured for the different power-saving signals in its search space set.

1. If the base station only configures one monitoring offset value for each search space set, which is available for both the long DRX cycle and the short DRX cycle, the monitoring offset values corresponding to the different search space sets are respectively offset_11, offset_12, offset_13.

2. If the base station only configures the two monitoring offset values for each search space set, which respectively correspond to the long DRX cycle and the short DRX cycle, the base station needs to additionally configure the following monitoring offset values: offset_11, offset_21, offset_12, offset_22, offset_13 and offset_23 which respectively correspond to the monitoring offset values of the different search space sets.

Here, the monitoring offset values of the power-saving signal and a start time of the DRX cycle needs to meet a different value, the specific relation is the same as example 1, which is not repeated here.

A subsequent process that the terminal monitors the power-saving signal is also the same as example 1, which is not repeated here.

An embodiment of the present disclosure further provides a base station.

Figure 4:
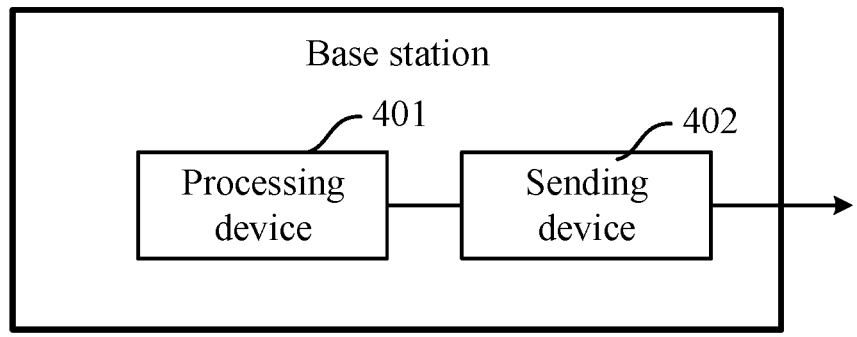
FIG. 4 exemplarily shows a schematic structural diagram of a base station in an embodiment of the present disclosure.

Referring to FIG. 4, which is a schematic structural diagram of a base station provided by an embodiment of the present disclosure. The base station may include: a processing device 401 and a sending device 402.

The processing device 401 is configured to configure search space set configuration information for a power-saving signal, and the search space set configuration information for the power-saving signal includes at least one of first configuration information and second configuration information, the first configuration information is search space set configuration information for the power-saving signal used when a terminal is in a short DRX cycle, and the second configuration information is search space set configuration information for the power-saving signal used when the terminal is in a long DRX cycle; and the sending device 402 is configured to send the search space set configuration information for the power-saving signal to the terminal.

The functions of all the devices in the above base station may refer to description of the functions implemented by the base station in the aforementioned embodiments, which is not repeated here.

An embodiment of the present disclosure further provides a terminal.

Figure 5:
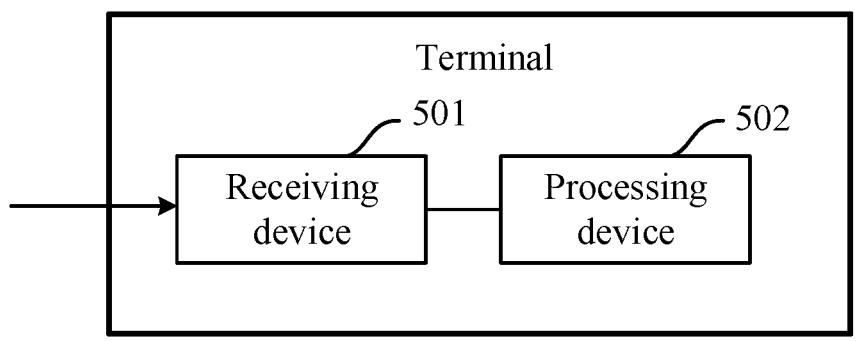
FIG. 5 exemplarily shows a schematic structural diagram of a terminal in an embodiment of the present disclosure.

Referring to FIG. 5, which is a schematic structural diagram of a terminal provided by an embodiment of the present disclosure. The terminal may include: a receiving device 501 and a processing device 502.

The receiving device 501 is configured to receive search space set configuration information for a power-saving signal sent by a base station, and the search space set configuration information for the power-saving signal includes first configuration information and/or second configuration information, the first configuration information is search space set configuration information for the power-saving signal used when the terminal is in a short DRX cycle, and the second configuration information is search space set configuration information for the power-saving signal used when the terminal is in a long DRX cycle; and the processing device 502 is configured to monitor the power-saving signal according to the search space set configuration information for the power-saving signal.

The processing device 502 is specifically configured to: monitor the power-saving signal by using the first configuration information when the terminal is in the short DRX cycle, and not monitor the power-saving signal when the terminal is in the long DRX cycle; or monitor the power-saving signal by using the second configuration information when the terminal is in the long DRX cycle, and not monitor the power-saving signal when the terminal is in the short DRX cycle; or monitor the power-saving signal by using the first configuration information when the terminal is in the short DRX cycle, and monitor the power-saving signal by using the second configuration information when the terminal is in the long DRX cycle.

The functions of all the devices in the above terminal may refer to description of the functions implemented by the terminal in the aforementioned embodiments, which is not repeated here.

An embodiment of the present disclosure further provides a communication apparatus.

Figure 6:
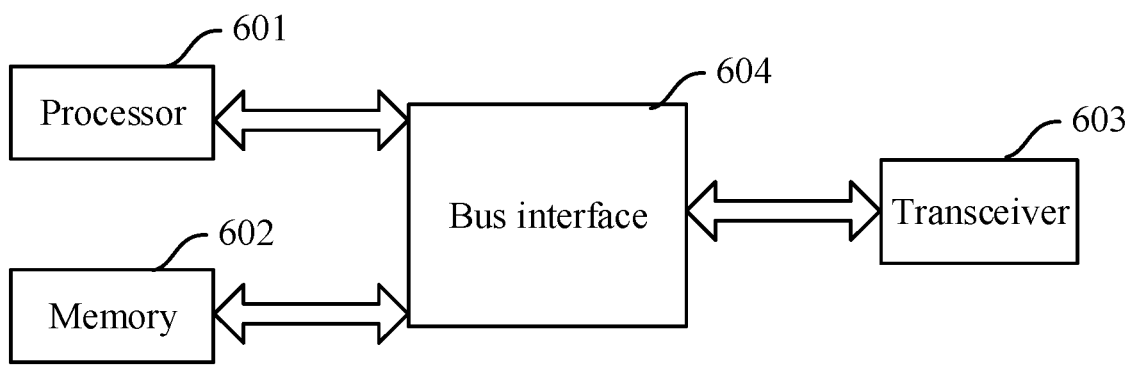
FIG. 6 exemplarily shows a schematic structural diagram of a communication apparatus in an embodiment of the present disclosure.

FIG. 6 exemplarily shows a schematic structural diagram of a communication apparatus in an embodiment of the present disclosure. The communication apparatus may be a base station. As shown in figure, the communication apparatus may include: a processor 601, a memory 602, a transceiver 603 and a bus interface 604.

The processor 601 is responsible for managing a bus architecture and usual processing, and the memory 602 may store data used by the processor 601 during operation execution. The transceiver 603 is configured to receive and send data under control of the processor 601.

The bus architecture may include any quantity of interconnected buses and bridges, which are specifically linked together by various circuits of one or more processors represented by the processor 601 and a memory represented by the memory 602. The bus architecture may further link various other circuits such as a peripheral device, a voltage stabilizer and a power management circuit together, which are publicly known in the art and therefore are not further described herein. The bus interface provides an interface. The processor 601 is responsible for managing a bus architecture and usual processing, and the memory 602 may store data used by the processor 601 during operation execution.

A flow disclosed in the embodiment of the present disclosure may be applied to the processor 601 or be implemented by the processor 601. In an implementation process, all steps of a signal processing flow may be completed through an integrated logic circuit of hardware in the processor 601 or in a software form. The processor 601 may be a general-purpose processor, a digital signal processor, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor may be a microprocessor or any conventional processor, etc. The steps of the method disclosed in combination with the embodiment of the present disclosure may be directly embodied as being executed and completed by a hardware processor, or be executed and completed by a hardware and software device combination in the processor. A software device may be located in a random access memory, a flash memory, a read only memory, a programmable read only memory, or an electrically erasable programmable memory, a register and other mature storage mediums in the art. The storage medium is located in the memory 602, and the processor 601 reads information in the memory 602, and is combined with its hardware to complete the steps of the signal processing flow.

Specifically, the processor 601 is configured to read a computer instruction in the memory 602 and execute functions implemented on a base station side in the flow shown in FIG. 2.

An embodiment of the present disclosure further provides a communication apparatus.

Figure 7:
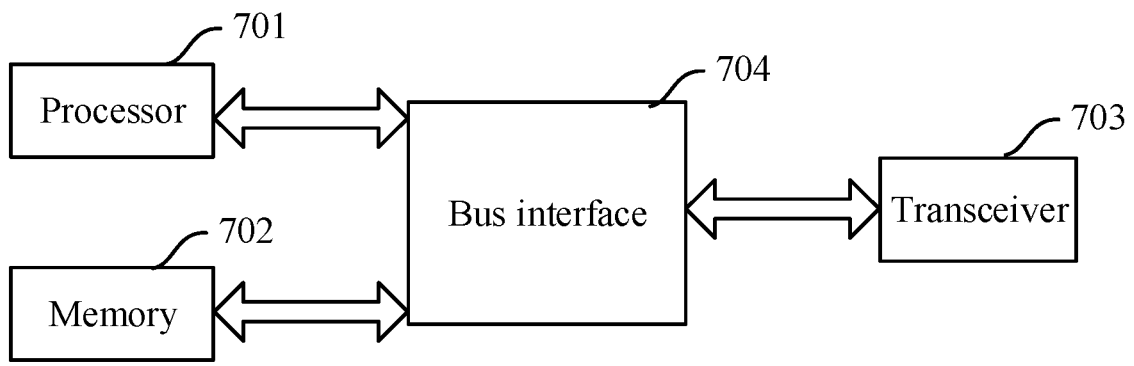
FIG. 7 exemplarily shows a schematic structural diagram of another communication apparatus in an embodiment of the present disclosure.

FIG. 7 exemplarily shows a schematic structural diagram of a communication apparatus in an embodiment of the present disclosure. The communication apparatus may be a terminal. As shown in figure, the communication apparatus may include: a processor 701, a memory 702, a transceiver 703 and a bus interface 704.

The processor 701 is responsible for managing a bus architecture and usual processing, and the memory 702 may store data used by the processor 701 during operation execution. The transceiver 703 is configured to receive and send data under control of the processor 701.

The bus architecture may include any quantity of interconnected buses and bridges, which are specifically linked together by various circuits of one or more processors represented by the processor 701 and a memory represented by the memory 702. The bus architecture may further link various other circuits such as a peripheral device, a voltage stabilizer and a power management circuit together, which are publicly known in the art and therefore are not further described herein. The bus interface provides an interface.

The processor 701 is responsible for managing a bus architecture and usual processing, and the memory 702 may store data used by the processor 701 during operation execution.

A flow disclosed in the embodiment of the present disclosure may be applied to the processor 701 or be implemented by the processor 701. In an implementation process, all steps of a signal processing flow may be completed through an integrated logic circuit of hardware in the processor 701 or in a software form. The processor 701 may be a general-purpose processor, a digital signal processor, an application specific integrated circuit, a field-programmable gate array or other programmable logic devices, a discrete gate or a transistor logic device, a discrete Hardware component, which can implement or execute all the methods, steps and logic block diagrams disclosed in the embodiment of the present disclosure. The general-purpose processor may be a microprocessor or any conventional processor, etc. The steps of the method disclosed in combination with the embodiment of the present disclosure may be directly embodied as being executed and completed by a hardware processor, or be executed and completed by a hardware and software device combination in the processor. A software device may be located in a random access memory, a flash memory, a read only memory, a programmable read only memory, or an electrically erasable programmable memory, a register and other mature storage mediums in the art. The storage medium is located in the memory 702, and the processor 701 reads information in the memory 702, and is combined with its hardware to complete the steps of the signal processing flow.

Specifically, the processor 701 is configured to read a computer instruction in the memory 702 and execute functions implemented on a terminal side in the flow shown in FIG. 3.

An embodiment of the present disclosure further provides a computer readable storage medium. The computer readable storage medium stores a computer executable instruction, and the computer executable instruction is configured to execute the above method executed by a base station in the above embodiment.

An embodiment of the present disclosure further provides a computer readable storage medium. The computer readable storage medium stores a computer executable instruction, and the computer executable instruction is configured to execute the above method executed by a terminal in the above embodiment.

The present disclosure is described with reference to flow charts and/or block diagrams of the methods, the devices (systems), and computer program products according to the embodiments of the present disclosure. It should be understood that each flow and/or block in the flow charts and/or the block diagrams and combinations of the flows and/or the blocks in the flow charts and/or the block diagrams can be implemented by computer program instructions. These computer program instructions may be provided to a processor of a general-purpose computer, a special-purpose computer, an embedded processing machine or other programmable data processing devices to generate a machine, and the instructions, when executed by the processor of the computer or other programmable data processing devices, generate an apparatus for implementing functions specified in one or more flows in the flow charts and/or one or more blocks in the block diagrams.

These computer program instructions may also be stored in a computer readable memory which can guide the computer or other programmable data processing devices to work in a specific mode, thus the instructions stored in the computer readable memory generates an article of manufacture that includes a commander apparatus that implement the functions specified in one or more flows in the flow charts and/or one or more blocks in the block diagrams.

These computer program instructions may also be loaded to the computer or other programmable data processing devices, and a series of operating steps are executed on the computer or other programmable devices to generate computer-implemented processing, and the instructions executed on the computer or other programmable devices provide steps for implementing the functions specified in one or more flows in the flow charts and/or one or more blocks in the block diagrams.

What is claimed is:

1. A power-saving signal configuration method, comprising:
    configuring, by a base station, search space set configuration information for a power-saving signal, wherein the search space set configuration information for the power-saving signal comprises at least one of first configuration information or second configuration information, the first configuration information is search space set configuration information for the power-saving signal used when a terminal is in a short discontinuous reception (DRX) cycle, and the second configuration information is search space set configuration information for the power-saving signal used when the terminal is in a long DRX cycle; and
    sending, by the base station, the search space set configuration information for the power-saving signal to the terminal;
    wherein the method comprises at least one of the following modes: the first configuration information comprises a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; or
    the second configuration information comprises a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle.

2. The method according to claim 1, wherein the method comprises at least one of the following modes: the first configuration information comprises a first monitoring periodicity, the first monitoring periodicity is N times of the short DRX cycle, and the N is an integer greater than or equal to 0; or
    the second configuration information comprises a second monitoring periodicity, the second monitoring periodicity is M times of the long DRX cycle, and the M is an integer greater than or equal to 1.

3. The method according to claim 1, wherein a first monitoring periodicity for the power-saving signal used when the terminal is in the short DRX cycle is associated with the short DRX cycle of the terminal, the first monitoring periodicity is N times of the short DRX cycle, and the N is an integer greater than or equal to 0; or
    a second monitoring periodicity for the power-saving signal used when the terminal is in the long DRX cycle is associated with the long DRX cycle of the terminal, the second monitoring periodicity is M times of the long DRX cycle, and the M is an integer greater than or equal to 1.

4. The method according to claim 1, further comprising:
sending, by the base station, a high-level signaling to the terminal, wherein the high-level signaling is configured to notify at least one of a first time offset or a second time offset, the first time offset is a time offset from a monitoring occasion for the power-saving signal used when the terminal is in the short DRX cycle to the short DRX cycle; and the second time offset is a time offset from a monitoring occasion for the power-saving signal used when the terminal is in the long DRX cycle to the long DRX cycle.

5. The method according to claim 1, wherein the method comprises at least one of the following modes: the first configuration information comprises a first monitoring time window, and the first monitoring time window is a slot length for continuously monitoring the power-saving signal when the terminal is in the short DRX cycle; or
the second configuration information comprises a second monitoring time window, and the second monitoring time window is a slot length for continuously monitoring the power-saving signal when the terminal is in the long DRX cycle.

6. A communication apparatus, comprising: a processor, a memory and a transceiver, wherein the processor is configured to read a computer instruction in the memory to execute the method according to claim 1.

7. The method according to claim 1, wherein the first configuration information comprises a first control resource set associated with a search space set, and the first control resource set is configured to indicate a resource occupied by the power-saving signal during the short DRX cycle; and
the second configuration information comprises a second control resource set associated with the search space set, and the second control resource set is configured to indicate a resource occupied by the power-saving signal during the long DRX cycle.

8. The method according to claim 1, wherein the first configuration information comprises a first power-saving signal monitoring pattern, and the first power-saving signal monitoring pattern is a power-saving signal monitoring pattern used when the terminal is in the short DRX cycle; and
the second configuration information comprises a second power-saving signal monitoring pattern, and the second power-saving signal monitoring pattern is a power-saving signal monitoring pattern used when the terminal is in the long DRX cycle.

9. The method according to claim 1, wherein the configuring, by the base station, the search space set configuration information for the power-saving signal, comprises:
configuring, by the base station, one search space set for the power-saving signal, wherein the search space set configuration information corresponding to the one search space set comprises at least one of the first configuration information or the second configuration information; or configuring, by the base station, a first search space set and a second search space set for the power-saving signal, wherein the search space set configuration information corresponding to the first search space set comprises the first configuration information, and the search space set configuration information corresponding to the second search space set comprises the second configuration information.

10. A power-saving signal transmission method, comprising:
receiving, by a terminal, search space set configuration information for a power-saving signal sent by a base station, wherein the search space set configuration information for the power-saving signal comprises first configuration information and/or second configuration information, the first configuration information is search space set configuration information for the power-saving signal used when the terminal is in a short discontinuous reception (DRX) cycle, and the second configuration information is search space set configuration information for the power-saving signal used when the terminal is in a long DRX cycle; and
monitoring, by the terminal, the power-saving signal according to the search space set configuration information for the power-saving signal; wherein
the monitoring, by the terminal, the power-saving signal according to the search space set configuration information for the power-saving signal, comprises:
monitoring the power-saving signal by using the first configuration information when the terminal is in the short DRX cycle, and not monitoring the power-saving signal when being in the long DRX cycle; or
monitoring the power-saving signal by using the second configuration information when the terminal is in the long DRX cycle, and not monitoring the power-saving signal when being in the short DRX cycle; or
monitoring the power-saving signal by using the first configuration information when the terminal is in the short DRX cycle, and monitoring the power-saving signal by using the second configuration information when being in the long DRX cycle;
wherein the method comprises at least one of the following modes: the first configuration information comprises a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; or the second configuration information comprises a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle;
the monitoring the power-saving signal by using the first configuration information when the terminal is in the short DRX cycle, comprises:
monitoring the power-saving signal according to a position corresponding to the first monitoring occasion offset or the first time offset when the terminal is in the short DRX cycle; or
the monitoring the power-saving signal by using the second configuration information when the terminal is in the long DRX cycle, comprises:
monitoring the power-saving signal according to a position corresponding to the second monitoring occasion offset or the second time offset when the terminal is in the long DRX cycle.

11. The method according to claim 10, wherein the method comprises at least one of the following modes: the first configuration information comprises a first monitoring periodicity, the first monitoring periodicity is N times of the short DRX cycle, and the N is an integer greater than or equal to 0; or the second configuration information comprises a second monitoring periodicity, the second monitoring periodicity is M times of the long DRX cycle, and the M is an integer greater than or equal to 1;

the monitoring the power-saving signal by using the first configuration information when the terminal is in the short DRX cycle, comprises:

monitoring the power-saving signal according to the first monitoring periodicity when the terminal is in the short DRX cycle; or the monitoring the power-saving signal by using the second configuration information when the terminal is in the long DRX cycle, comprises:

monitoring the power-saving signal according to the second monitoring periodicity when the terminal is in the long DRX cycle.

12. The method according to claim 10, wherein the method comprises at least one of the following modes: a first monitoring periodicity for the power-saving signal used when the terminal is in the short DRX cycle is associated with the short DRX cycle of the terminal, the first monitoring periodicity is N times of the short DRX cycle, and N is an integer greater than or equal to 0; or a second monitoring periodicity for the power-saving signal used when the terminal is in the long DRX cycle is associated with the long DRX cycle of the terminal, the second monitoring periodicity is M times of the long DRX cycle, and M is an integer greater than or equal to 1.

13. The method according to claim 10, wherein the method comprises at least one of the following modes: the monitoring the power-saving signal by using the first configuration information when the terminal is in the short DRX cycle, comprises:

monitoring the power-saving signal according to a position corresponding to a first time offset when the terminal is in the short DRX cycle, wherein the first time offset is a time offset from a monitoring occasion for the power-saving signal used when the terminal is in the short DRX cycle to the short DRX cycle, and the first time offset is notified by the base station through a high-level signaling; or the monitoring the power-saving signal by using the second configuration information when the terminal is in the long DRX cycle, comprises:

monitoring the power-saving signal according to a position corresponding to a second time offset when the terminal is in the long DRX cycle, wherein the second time offset is a time offset from a monitoring occasion for the power-saving signal used when the terminal is in the long DRX cycle to the long DRX cycle, and the second time offset is notified by the base station through the high-level signaling.

14. The method according to claim 10, wherein the method comprises at least one of the following modes: the first configuration information comprises a first monitoring time window, and the first monitoring time window is a slot length for continuously monitoring the power-saving signal when the terminal is in the short DRX cycle; or the second configuration information comprises a second monitoring time window, and the second monitoring time window is a slot length for continuously monitoring the power-saving signal when the terminal is in the long DRX cycle;

the monitoring the power-saving signal by using the first configuration information when the terminal is in the short DRX cycle, comprises:

monitoring the power-saving signal within a corresponding slot length according to the first monitoring time window when the terminal is in the short DRX cycle; or the monitoring the power-saving signal by using the second configuration information when the terminal is in the long DRX cycle, comprises:

monitoring the power-saving signal within a corresponding slot length according to the second monitoring time window when the terminal is in the long DRX cycle.

15. The method according to claim 10, wherein the method comprises at least one of the following modes: the first configuration information comprises a first control resource set associated with a search space set, and the first control resource set is configured to indicate a resource occupied by the power-saving signal during the short DRX cycle; or the second configuration information comprises a second control resource set associated with the search space set, and the second control resource set is configured to indicate a resource occupied by the power-saving signal during the long DRX cycle;

the monitoring the power-saving signal by using the first configuration information when the terminal is in the short DRX cycle, comprises:

monitoring the power-saving signal by using a corresponding resource according to the first control resource set when the terminal is in the short DRX cycle; or the monitoring the power-saving signal by using the second configuration information when the terminal is in the long DRX cycle, comprises:

monitoring the power-saving signal by using a corresponding resource according to the second control resource set when the terminal is in the long DRX cycle.

16. A communication apparatus, comprising: a processor, a memory and a transceiver, wherein the processor is configured to read a computer instruction in the memory to execute:

receiving search space set configuration information for a power-saving signal sent by a base station, wherein the search space set configuration information for the power-saving signal comprises first configuration information and/or second configuration information, the first configuration information is search space set configuration information for the power-saving signal used when a terminal is in a short discontinuous reception (DRX) cycle, and the second configuration information is search space set configuration information for the power-saving signal used when the terminal is in a long DRX cycle; and monitoring the power-saving signal according to the search space set configuration information for the power-saving signal, wherein the monitoring, by the terminal, the power-saving signal according to the search space set configuration information for the power-saving signal, comprises:

monitoring the power-saving signal by using the first configuration information when the terminal is in the short DRX cycle, and not monitoring the power-saving signal when being in the long DRX cycle; or monitoring the power-saving signal by using the second configuration information when the terminal is in the long DRX cycle, and not monitoring the power-saving signal when being in the short DRX cycle; or monitoring the power-saving signal by using the first configuration information when the terminal is in the short DRX cycle, and monitoring the power-saving signal by using the second configuration information when being in the long DRX cycle;

wherein the apparatus comprises at least one of the following modes: the first configuration information comprises a first monitoring occasion offset or a first time offset, the first monitoring occasion offset is a monitoring occasion offset for the power-saving signal used when the terminal is in the short DRX cycle, and the first time offset is a time offset from a monitoring occasion for the power-saving signal used when the terminal is in the short DRX cycle to the short DRX cycle; or the second configuration information comprises a second monitoring occasion offset or a second time offset, the second monitoring occasion offset is a monitoring occasion offset for the power-saving signal used when the terminal is in the long DRX cycle, and the second time offset is a time offset from a monitoring occasion for the power-saving signal used when the terminal is in the long DRX cycle to the long DRX cycle; and the processor is further configured to:

monitor the power-saving signal according to a position corresponding to the first monitoring occasion offset or the first time offset when being in the short DRX cycle; or monitor the power-saving signal according to a position corresponding to the second monitoring occasion offset or the second time offset when being in the long DRX cycle.

17. The apparatus according to claim 16, wherein the apparatus comprises at least one of the following modes: the first configuration information comprises a first monitoring periodicity, the first monitoring periodicity is N times of the short DRX cycle, and the N is an integer greater than or equal to 0; or the second configuration information comprises a second monitoring periodicity, the second monitoring periodicity is M times of the long DRX cycle, and the M is an integer greater than or equal to 1;

the processor is further configured to:

monitor the power-saving signal according to the first monitoring periodicity when being in the short DRX cycle; or monitor the power-saving signal according to the second monitoring periodicity when being in the long DRX cycle.

18. The apparatus according to claim 16, wherein the apparatus comprises at least one of the following modes: a first monitoring periodicity for the power-saving signal used when the terminal is in the short DRX cycle is associated with the short DRX cycle of the terminal, the first monitoring periodicity is N times of the short DRX cycle, and N is an integer greater than or equal to 0; or a second monitoring periodicity for the power-saving signal used when the terminal is in the long DRX cycle is associated with the long DRX cycle of the terminal, the second monitoring periodicity is M times of the long DRX cycle, and M is an integer greater than or equal to 1.

19. The apparatus according to claim 16, wherein the processor is further configured to:

monitor the power-saving signal according to a position corresponding to a first time offset when being in the short DRX cycle, wherein the first time offset is a time offset from a monitoring occasion for the power-saving signal used when the terminal is in the short DRX cycle to the short DRX cycle, and the first time offset is notified by the base station through a high-level signaling; or monitor the power-saving signal according to a position corresponding to a second time offset when the terminal is in the long DRX cycle, wherein the second time offset is a time offset from a monitoring occasion for the power-saving signal used when the terminal is in the long DRX cycle to the long DRX cycle, and the second time offset is notified by the base station through the high-level signaling.

20. The apparatus according to claim 16, wherein the apparatus comprises at least one of the following modes: the first configuration information comprises a first monitoring time window, and the first monitoring time window is a slot length for continuously monitoring the power-saving signal when the terminal is in the short DRX cycle; or the second configuration information comprises a second monitoring time window, and the second monitoring time window is a slot length for continuously monitoring the power-saving signal when the terminal is in the long DRX cycle; and the processor is further configured to:

monitor the power-saving signal within a corresponding slot length according to the first monitoring time window when being in the short DRX cycle; or monitor the power-saving signal within a corresponding slot length according to the second monitoring time window when the terminal is in the long DRX cycle.

* * * * *